(12) United States Patent
Lee et al.

(10) Patent No.: US 6,786,954 B1
(45) Date of Patent: Sep. 7, 2004

(54) DOCUMENT SECURITY METHOD UTILIZING MICRODROP COMBINATORICS, INK SET AND INK COMPOSITION USED THEREIN, AND PRODUCT FORMED

(75) Inventors: Eric R. Lee, Redwood City, CA (US); Martin L. Perl, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/567,006

(22) Filed: May 9, 2000

Related U.S. Application Data

(60) Provisional application No. 60/138,534, filed on Jun. 10, 1999.

(51) Int. Cl.[7] .......................... C09D 11/02; B42D 15/00
(52) U.S. Cl. ............................. 106/31.13; 106/31.15; 106/31.6; 106/31.27; 462/903; 283/72; 283/92
(58) Field of Search ...................... 106/31.13, 31.15, 106/31.6, 31.27; 252/301.34, 301.35; 283/72, 85, 86, 87, 88, 89, 90, 91, 92, 93, 94; 462/903

(56) References Cited

U.S. PATENT DOCUMENTS

| | | | | |
|---|---|---|---|---|
| 3,886,083 A | * | 5/1975 | Laxer ..................... | 252/301.16 |
| 4,725,316 A | * | 2/1988 | Mahany, II ................. | 106/420 |
| 5,554,842 A | * | 9/1996 | Connell et al. ............. | 235/491 |
| 5,679,141 A | * | 10/1997 | McInerney et al. ........ | 106/31.6 |
| 5,702,511 A | * | 12/1997 | de Saint-Romain et al. ........................ | 106/31.31 |
| 5,759,246 A | * | 6/1998 | Frey et al. ................ | 106/31.32 |
| 5,843,564 A | * | 12/1998 | Gasper et al. .............. | 428/211 |
| 5,856,266 A | * | 1/1999 | Gasper et al. .............. | 503/206 |
| 5,861,447 A | * | 1/1999 | Nagasawa et al. .......... | 523/161 |
| 6,001,899 A | * | 12/1999 | Gundlach et al. ........... | 523/160 |
| 6,103,353 A | * | 8/2000 | Gasper et al. .............. | 428/195 |
| 6,274,065 B1 | * | 8/2001 | Deno et al. ............ | 252/301.16 |
| 6,290,762 B1 | * | 9/2001 | Elwakil .................... | 106/31.27 |

* cited by examiner

*Primary Examiner*—Mark L. Bell
*Assistant Examiner*—Veronica F. Faison
(74) *Attorney, Agent, or Firm*—Antonelli, Terry, Stout & Kraus, LLP

(57) ABSTRACT

Disclosed are sets of ink components, and ink compositions, useful for printing markings, on security documents, that are relatively resistant to counterfeiting. Also disclosed are the security documents formed, a method of printing and a method of authenticating the printed material. The markings, formed of the ink compositions have a spectral response that deviates from a predicted spectral response when linearly additively combining spectral responses of components of the ink composition, so that it becomes difficult to reverse-engineer the ink composition from the markings. Use of plural different markings, with each marking being a microdot, increases difficulty in counterfeiting. By forming a template of spectral responses of the original pattern, spectral responses of a pattern on an unknown document can be compared to the spectral responses on the template for determining whether the unknown document is authentic. Formation of the markings is facilitated using an inkjet printer.

34 Claims, 28 Drawing Sheets

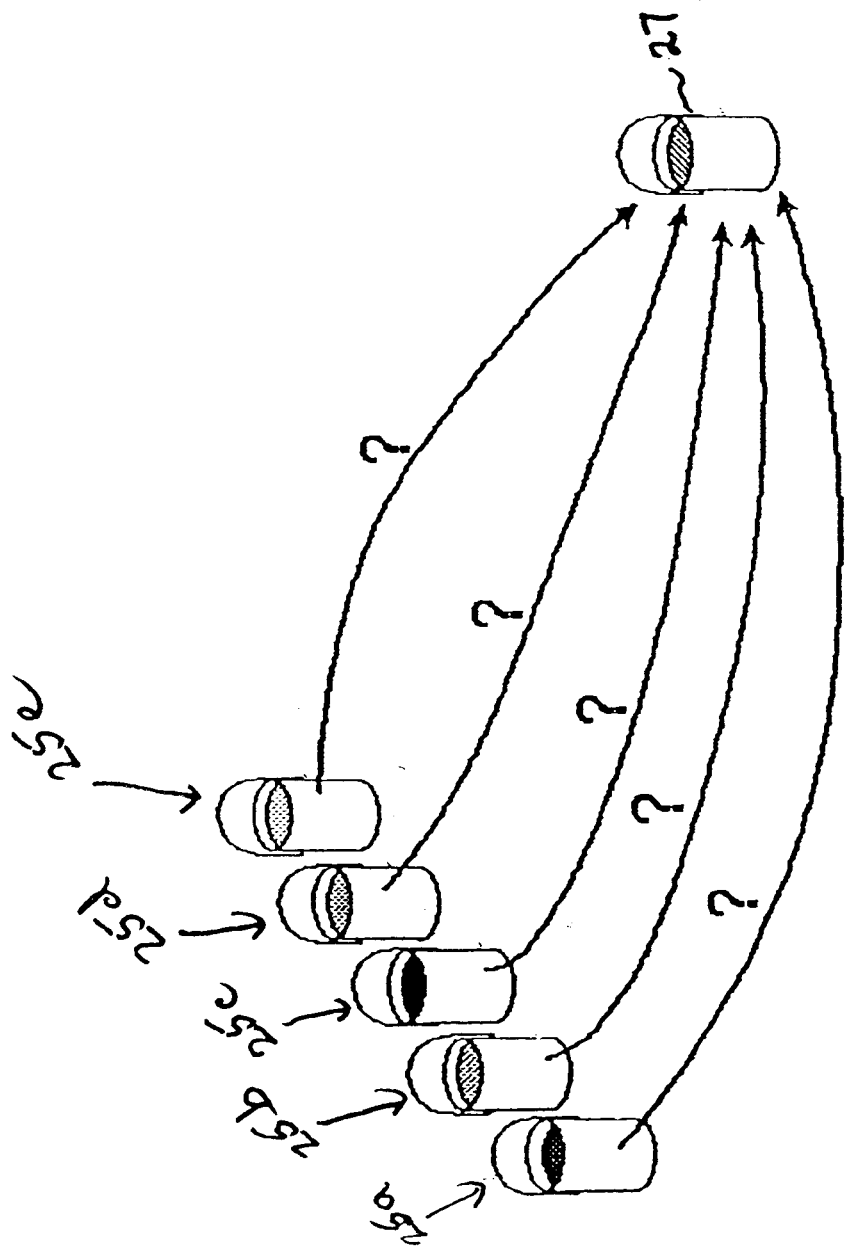

DOCUMENT SECURITY METHOD UTILIZING MICRODROP COMBINATORICS, INK SET AND INK COMPOSITION USED THEREIN, AND PRODUCT FORMED

This application claims priority under 35 USC 119(e) based on provisional U.S. patent application Ser. No. 60/138,534, filed Jun. 10, 1999.

BACKGROUND OF THE INVENTION

The present invention relates to processes for authenticating objects, ink sets and ink compositions used in such processes, and objects formed using such ink sets and ink compositions. The present invention also relates to an ink which can be used for labeling an object (for example, a document or other object) with identifying markings which can be rapidly verified as authentic and which are highly resistant to counterfeiting. In particular, the present invention relates to inks, for security documents, which can be used with low cost and available ("off-the-shelf") technology for hardware, for verifying authenticity, and to methods of printing using such inks and methods of verifying authentication of objects containing markings of such inks.

Widespread availability of inexpensive document scanners and color inkjet printers has created a severe problem, in that they have facilitated the creation of counterfeit documents in areas ranging from financial papers, access control documents, official identification documents, trademarked consumer goods, industrial component certifications, currency and entertainment event tickets.

Traditional government and corporate anti-counterfeiting technology has utilized techniques for discouraging copying based on restricting access to crucial raw materials such as special papers or inks, and by using printing techniques that require machines so costly that few can afford to acquire the necessary printing hardware. Such techniques include use of optical variable devices, such as holograms, embossed diffraction gratings, thin film interference coatings, laser images, etc.; special inks including ultraviolet, fluorescent, infrared, liquid crystal, magnetic, photochromic, thermochromic, optically variable, metallic and thermochromic color shifting inks, etc.; special substrates such as security papers, metallic threads, watermarks, embedded security strips, etc.; and exotic printing techniques such as laser engraving, intaglio printing, microprinting, continuous color shift printing, spatially periodic printed structures, see-through patterns (dual-sided printing), screen-angle modulation for periodic structure, etc. The intent behind these methods is to make the replication of the original document impossible without access to highly expensive printing hardware, or the authorization to purchase restricted raw materials such as special papers and inks. Most of these security labeling techniques rely upon the appearance of the object viewer whose visual examination of the object is the criterian used for its acceptance as a legitimate document.

These techniques are currently being compromised due to the availability of low-cost sophisticated color printers, image scanners and image processing software designed for use with personal computers. In addition, increasing sophistication in the commercial graphics arts fields has resulted in techniques used to produce objects such as embossed holograms, kinetigrams and diffractive color changing objects becoming public knowledge. Counterfeit credit cards and software certification labels having forged holograms have already been produced. Formerly exotic printing materials such as color-changing paint are being introduced commercially into areas as mundane as automotive painting. Human-verified visual security features in general are being rendered less effective with time, by the increasing ability to utilize commercial and consumer quality graphics hardware to make reproductions that while often not identical are rendered close enough to the original to pass a retail transaction inspection. Another reason for the failure of certain economic denial-of-resources based anti-counterfeiting technologies is that the profits in some areas of brand-named goods forgery is lucrative enough for counterfeiters to justify matching the expenditures of the legitimate printer of anti-counterfeiting labels. Another disadvantage is that these techniques of combating counterfeiting tend to restrict the printing of secure documents to those printed by large governments and wealthy corporations.

One attempt to counter this trend has been to introduce machine-readable security features into the protected documents. Some of the techniques include embedded magnetic strips, magnetic inks, periodic printed patterns that produce a Moirè pattern when viewed by electronic vision equipment, and recently data embedded in high resolution embossed patterns similar in format to CDROMs.

However, magnetic strips have been shown to be vulnerable to forgery with low-cost hardware. Embedded silicon chips are not physically useable for most paper-based documents. Optical card technology is suitable for mechanically stiff protected objects such as credit cards that can be fed into appropriate readers, but like smart chips is not physically compatible with the majority of documents requiring forgery protection. Printed bar codes are vulnerable to being duplicated by inkjet printers.

U.S. Pat. No. 3,928,226 to McDonough, et al. discloses an ink composition which can be provided for machine-readable tickets, tags, labels, postal imprints and the like, having (1) a visible color, that is, a color under ordinary mixed light frequencies, and (2) a fluorescent radiation color which, when irradiated with. ultraviolet life, for example, fluoresces preferably in the red wavelength of about 5800 Å to 6200 Å. The ink imprint may be read visually and then read by a fluorescent machine reader which is set to pick up the fluorescent wavelength of the ink. Thus, this technique checks two different properties of a same ink.

U.S. Pat. No. 5,289,527 to Ligas, et al. discloses a method for authenticating articles, using a mixture of at least two photochromic compounds, the activated spectra having different absorption maxima. This patent discloses that by using combinations of photochromic compounds having instrumentally identifiable different activated spectra and preferably also other identifiable different photochromic properties, a verifying instrument can be used to identify the individual photochromic compounds used in the display data and thereby authenticate the article. This patent also discloses that basing authentication on different activated spectra and other defined characteristic photochromic properties of at least two photochromic compounds enables a large number of combinations and permutations which may be used to authenticate an article, increasing substantially the difficulty of copying the total system and thereby facilitating identification of counterfeit articles.

When using a mixture of coloring agents (for example, a mixture of dyes or a mixture of pigments), in one instance the spectral responses of the mixture of components containing the plurality of pigments and/or dyes are linearly additive (e.g., linear mixing of the spectra, or linearly additively combining of the spectral responses). This can be seen in FIGS. 1a–1c. Using fluorescence as an example, suppose that as shown in FIG. 1a a first pigment gives the fluorescent spectrum 1, and a second pigment gives the fluorescent spectrum 3 shown in FIG. 1b. If there is one-half as much of the first pigment as compared to the second pigment in a mixture formed from the first and second pigments, then the total fluorescent spectrum of the mixture will be that shown in FIG. 1c, having intensities 5 and 7, where the spectral response of the mixture is a linearly additive combining of the spectral responses of each pigment. If there is one-tenth as much of the first pigment as compared to the second pigment in the mixture, then such mixture will have a total fluorescent spectrum as shown in FIG. 1d with intensity maxima 9 and 11, where the spectra of the two pigments are linearly additive.

Linear mixing can provide a great variety of spectral patterns; however, where a well-equipped and determined counterfeiter has acquired knowledge of the set of inks used on a particular document, and also has a reader for reading such documents, by measuring the spectrum of a marking (e.g., dot) and knowing the set of inks used to print the marking the counterfeiter in a few trials can determine the mix the pigments used to make the marking and can reproduce the desired spectrum of the marking, and can thereby provide what appears to be an authentic document which in fact is a counterfeit. While, with many markings using different mixtures of inks, it becomes a tedious task to determine the compositions of the markings, if the set of inks used on a particular document is known such task becomes much easier using a computer. For example, a counterfeiter could use the reader to obtain separate spectra of each ink component, and then use equations of linear mixing in a computer to determine the linearly mixed ink composition of each marking. While use of special, secure ink sets will greatly inhibit the ability to provide a counterfeit, such special, secure ink sets are usually expensive, detracting from linear mixing as a technique for avoiding counterfeiting. Moreover, limited distribution ink sets as an anti-counterfeiting measure is also vulnerable to compromise by theft and unauthorized sales, and diversion or theft of such ink sets can potentially compromise thousands of protected items.

Accordingly, it is still desired to provide a technique for providing a secure object (e.g., document) and for verifying authenticity of the object, which is highly resistant to counterfeiting and which can use inexpensive and plentiful hardware components, and which provides rapid verification of authenticity. It is desired to provide such technique highly resistant to counterfeiting, notwithstanding the present day use of basic inkjet, imaging and computer image processing technology which have facilitated the creation of counterfeit documents.

SUMMARY OF THE INVENTION

The foregoing needs are satisfied through use of the technique of non-linearity of spectral response in the at least one marking checked for authenticity. That is, the marking has a spectral response which deviates from a predicted linearly additive spectral response, the prediction being formed by adding the spectral responses of the ink components which form the ink composition making the marking. Through use of the non-linearity (also described herein as "nonadditive" color combining or mixing), a "trap-door" printing function can be used in order to hinder a counterfeiter. Thus, a "trap-door" printing function (one in which it is easy and cheap to print a, e.g., security label, but in which the printing technology makes it hard and expensive to figure out how to duplicate it) is implemented for the purposes of the present invention. Because of the difficulty of determining the proportions of each ink component used to form the ink making each dot (due, e.g., to the non-linearity of the spectral response of the ink making each dot, relative to spectral responses of these ink components), from the dot itself, a counterfeiter has to expend orders of magnitude more effort to duplicate the label than does the legitimate printer, rather than having to merely match the resources of the person printing the original label. That is, due to, e.g., non-linear (nonadditive) combining of spectral responses (for example, reflectance, fluorescence or absorption) of ink components forming the ink mixture of the marking, it becomes much more difficult to reverse engineer the printing ink composition of the marking, thereby hindering the counterfeiter. This is true even if the set of inks, forming the ink composition which made the marking, was known by the counterfeiter.

Thus, according to the present invention, security is implemented not by making critical components expensive or available only through restricted channels, but by securing a data key which contains the information about which inks were used to form each of the markings and in what proportion they were mixed for each marking; the basis to avoid counterfeiting is not expensive and restricted, e.g., inks, substrates, etc., but rather is a data key which indicates the ink components, and it is much more feasible keeping the data, key from a counterfeiter. The data key is the information necessary to reproduce the original security label. For security labels where the ink mixtures for each dot are determined by hardware random number generators, this data key may consist of a multimegabyte data file containing the mixture ratios for each individual dot giving each ink color used and in what proportions for that particular security label. Alternately, the data key for the same size array could be a password or pass phase for a security label with mixture ratios determined by a seeded software-based, random number generator. Thus, the present invention is usable in connection with low security documents and can be effective in high security applications, with printing/verification being achieved using ordinary and low cost hardware and ink components.

Non-linear mixing or combining of pigment spectra, or a spectral response of a mixture which deviates from a predicted linearly additive spectral response of the individual spectral responses of the components of the mixture, is a known phenomenon. Such non-linear mixing can be shown in connection with FIGS. 2a–2c. Suppose a first pigment, when used by itself, has the fluorescent spectrum shown in FIG. 2a, with intensity maxima at curves 21 and 23. Suppose another ink in a set contains a second pigment, that is itself not fluorescent but which changes the spectra of pigment 1; for example, 0.01 parts of the second pigment when mixed with the first pigment changes the spectrum of the first pigment as shown in FIG. 2b, having intensity maxima of curves 17 and 19. That is, the part of the first pigment spectrum 21 in wavelength segment 2 (350–400 nm) is not effected by the presence of the second pigment, but the 0.01 part of the second pigment reduces by 80% the strength of the spectrum of the first pigment that lies in the 5–8 wavelength segments (curve 19). A counterfeiter who has a reader and who has the ink containing the first pigment and the ink containing the second pigment will still have to carry out a large number of trials in order to find the mixture that produces the spectrum in FIG. 2b. Particularly where there is very little material in the marking (for example, a microdot is used), quantitative analysis of the molecular composition is very difficult and difficulties of the counterfeiter increase many times when a plurality of different markings are used, having, for example, different amounts of the second pigment mixed with the first pigment.

Moreover, this difficulty would further increase where there are more than two inks in the set of inks. For example, suppose a third ink contained a third pigment, not in itself fluorescent but capable of enhancing the strength of the short wavelength part of the spectrum of the first pigment. Then the mixture of the three pigments would produce the spectrum in FIG. 2c, including increased intensity as shown by curve 22. This, of course, adds immensely to the difficulty of counterfeiting a pattern.

Thus, utilizing desired sets of inks, resistance to counterfeiting greatly increases.

Specifically, as one aspect of the present invention, the present invention provides a set of ink components for providing ink compositions to form markings of an object, the set including a plurality of different ink components having respective spectral responses, whereby at least two of the different ink components can be mixed together to provide an ink composition, such ink components, when mixed together, providing a spectral response of the mixture which deviates from a predicted spectral response when linearly additively combining the respective spectral responses of the at least two of the different ink components.

As another aspect of the present invention, there is an ink composition comprising a mixture of at least two ink components having respective spectral responses, wherein the spectral response of the mixture deviates from a predicted spectral response when linearly additively combining the respective spectral responses of the ink components of the mixture. While each of the two ink components can have a color, it is also possible that at least one of the ink components does not have a color by itself, but affects the spectral response of another ink component when the components are mixed.

According to another aspect of the present invention, the ink composition can be applied to an object, whereby authenticity of the object can be determined. The object can include a plurality of the markings, and each marking can be a microdot, in order to increase difficulty of counterfeiting the markings (i.e., the object). Desirably, each of the markings is a microdot, and each microdot preferably can be substantially invisible to the human eye. Use of the marking as a microdot limits amount of material of the ink composition in the marking, further increasing difficulty in counterfeiting the marking (that is, increasing the difficulty in determining components of the ink forming the mark due to these being only a small amount of the ink).

As a further aspect of the present invention, the object can include two (or more) markings respectively of different inks having different spectral responses; and wherein at least one of the first and second spectral responses has an effect on the other such that spectral response of at least one of the first and second markings differs from the first or second spectral response of the respective inks. Again, due to such interaction it becomes more difficult to "reverse engineer" the ink of the markings, and becomes more difficult to counterfeit the markings.

As another aspect of the present invention, the object includes a substrate with at least one marking thereon; and the ink of the marking interacts with the substrate such that the spectral response of the marking is different from the spectral response of the ink. Again, such interaction masks the ability to reverse engineer, and enhances difficulty of the counterfeiter.

Another aspect of the present invention is a printing method, wherein the ink composition is applied to a substrate, e.g., to form a marking on the substrate. Preferably, the ink composition is an inkjet composition, with the composition being applied to the substrate by an inkjet printer (e.g., a standard inkjet printer). Accordingly, convenient and inexpensive hardware can be utilized for forming the markings on the object, to provide an object which can easily be authenticated.

According to a further aspect of the present invention, the printing method further includes selecting at least two of the plurality of different ink components of the set of ink components as previously discussed, with a mixture of these ink components being applied to a substrate as a marking. Moreover, additional selections of at least two of the plurality of different ink components of the set can be performed, to provide markings (e.g., microdots) having different spectral responses, further complicating the ability to counterfeit the markings.

According to further aspects of the present invention, a matching template is made which indicates authentic markings on the substrate of the object; through use of such template, verification of authenticity of the markings on the object can easily and rapidly be performed.

The matching template is the information that exists on, e.g., a verification computer which is compared with the information measured from the, e.g., security label in question to determine whether the security label in question is genuine. Due to the nonadditive color mixing (non-linearly additive color combining), the matching template cannot practically be determined calculationally from the data key, but can be generated by printing and then taking measurements of the resultant printed security label. Conversely due to the nonadditive color mixing, the data key cannot be derived computationally given the matching template. This is the essence of the one-way function. Such one-way function is particularly effective where the nonadditive color mixing is strong.

The original printer prints the label using the mixtures at each point as defined by the printer's personal data key and then takes multispectral measurements of the label to make the matching template for that label. Anyone with the printing hardware and the data key can generate a matching template at will by printing out a label using the data key to define the mixtures and then taking measurements of the spectral characteristics of the resultant printed security label. If one possesses only the printed label without possessing the data key one is always free to make a matching template; however, one cannot replicate the label since that would require obtaining the data key or its equivalent from the matching template, which with a properly designed inkset and printer should be an intractably hard task.

The matching template for the purpose of this invention is a multi-spectral contour map made from the measured relative intensities of each area of the security array at each characterized wavelength. For a microdot-based array this is the contour map made from the measured relative intensity at each wavelength of each microdot relative to its neighbors. The matching template is desirably stored as an array of numbers on the computer or computers used to verify the legitimacy of the security label in question. If the nonlinearly additive color mixing is strong and the resultant spectra complex, the matching templates for legitimate security label protected items can be made public without compromising the protected item.

Furthermore, the method of the present invention lends itself to implementation via computer, computer-controlled inkjet printers and computer networking technology. That is, the template can be stored as an intensity contour in a computer, and measurements of markings on an object can be compared thereto to determine authenticity. The matching template can be stored at a remote server, with measured (tested) objects at a distant location having the measurements sent, for example, over the Internet, for comparison with the matching template at the remote server.

According to another aspect of the present invention, coloring material is applied to a substrate, and such coloring material is selectively reacted so as to change the spectral response of reacted portions thereof. Again, due to difficulty in reverse engineering the spectral response of reacted portions, difficulty in counterfeiting is enhanced.

The present invention has many uses, both in connection with high-security and low-cost implementation. For example, the present invention can be used in general for document security, counterfeit detection and physical access control (for example, in optical card keys). Various specific uses include trademark and label verification, use directly as an optical card key, credit card protection, identification badge security, passport and visa verification, check verification, and identification document (e.g., birth certificate and immigration card) authentication. The present invention can be utilized on ownership or title documents in order to verify authenticity thereof (prevent counterfeiting), and can be utilized for protecting brand name goods and labeling semiconductor chips. The present invention can also be used for verifying music and video CDs, verifying software source disks and verifying drug prescriptions. The present invention can also be used for providing password control for high value software, authenticating collectibles, providing protection for entertainment and event tickets and guarding against forged parts certification. The present invention can also be utilized for providing counterfeit-resistance tags for legal and financial documents. The present invention can provide tamper resistant seals and labeling, and can also be utilized for providing postage stamps.

Thus, the present invention moves in a different direction for combating the counterfeiter. It does not rely upon denial of access to sophisticated and expensive hardware, but relies upon methods more akin to cryptography, with the ability to reproduce a security tag being dependent upon possession of a piece of information similar to a cryptographic key rather than the exclusive possession of certain pieces of hardware. Without possession of the specific information key, even if the counterfeiter is in possession of the original printed object and printing hardware used to create it, counterfeiting can not easily be achieved.

Accordingly, the present invention enables a security printing technique to be achieved without the need for sophisticated printing hardware or restricted access materials. The use of this technique for the present invention is not dependent upon a person's ability to purchase expensive hardware or control distribution of restricted access raw materials, and potentially enables low-cost consumer-grade computer hardware to be used to print secure documents. The present invention is more resistant to being compromised by thefts of raw materials or from attacks by a well-financed counterfeiter.

The printers and readers used in the present invention can be provided by applying available technology for some custom modifications of "off the shelf" items. The printers used in the present invention, for example and not to be limiting, have firmware modifications to allow them to be commanded to print ink dots directly on top of previously printed ink dots. Since current printers print complex colors by printing a multi-color mosaic of individual primary colors, "off the shelf" printers will require an internal operating code modification to print dots on top of each other. The readers can be assembled using "off the shelf" components and some custom software.

Moreover, the present invention can be used in combination with conventional security printing methods, to provide an even further enhanced security and confidence level in avoiding counterfeiting. For instance, the use of restricted-access, custom inks, non-commercially available ultra-high resolution print heads, and non-standard wavelength verification, and the use of print heads which print with much larger numbers of different ink types than commercial print heads, are examples of augmenting the present invention with conventional security printing techniques.

A further advantage according to the present invention is that it becomes economically practical to print and have archived unique security labels for each individual item to be protected. This is in contrast to documents protected by conventional security labels such as holograms, where a single successful forgery can be used to compromise thousands of protected documents.

The potentially very low cost of the optical reader, combined with verification of patterns over the Internet, can allow the average consumer or employer to check the authenticity of brand name goods, collectibles and legal documents (for example, checks, diplomas, and immigration work permits).

Moreover, counterfeiting by label transfer has been used as a method of defeating optical variable device-based (for example, hologram-based) security labeling. The ability of inkjet techniques to be used according to the present invention, to allow direct printing of the security pattern onto the item to be protected, allows industrial parts, electronic chips and construction materials to have greater protection against substitution by a counterfeiter of substandard parts.

The technique of the present invention can be readily scaled for use in both low and high security applications. For example, amusement park ride tickets might be printed with an identical low density dot pattern verified at only one wavelength by readers having the matching pattern stored locally in its own memory. Diplomatic passports might have security labels which utilize proprietary inks, have million drop arrays printed with nonstandard ultra-high resolution print heads, have imaging done at multiple wavelengths including in the infrared and ultraviolet, and require confirmation by multiple remote servers, providing a very high level of security. Thus, the present invention has the additional advantage of great flexibility in its application.

BRIEF DESCRIPTION OF THE DRAWINGS

FIG. 3 illustrates schematically the forming of an ink composition from a plurality of ink components, according to the present invention.

DETAILED DESCRIPTION OF THE INVENTION

Figure 1A:
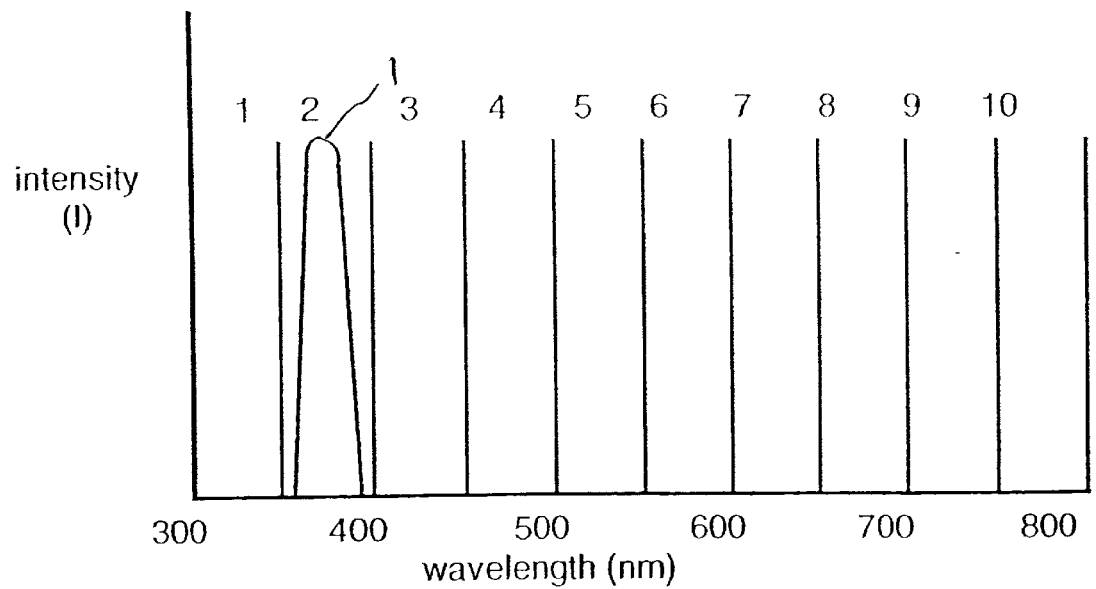
FIGS. 1a–1d are graphs for illustrating linearly additive color combining of spectral responses.
Figure 1B:
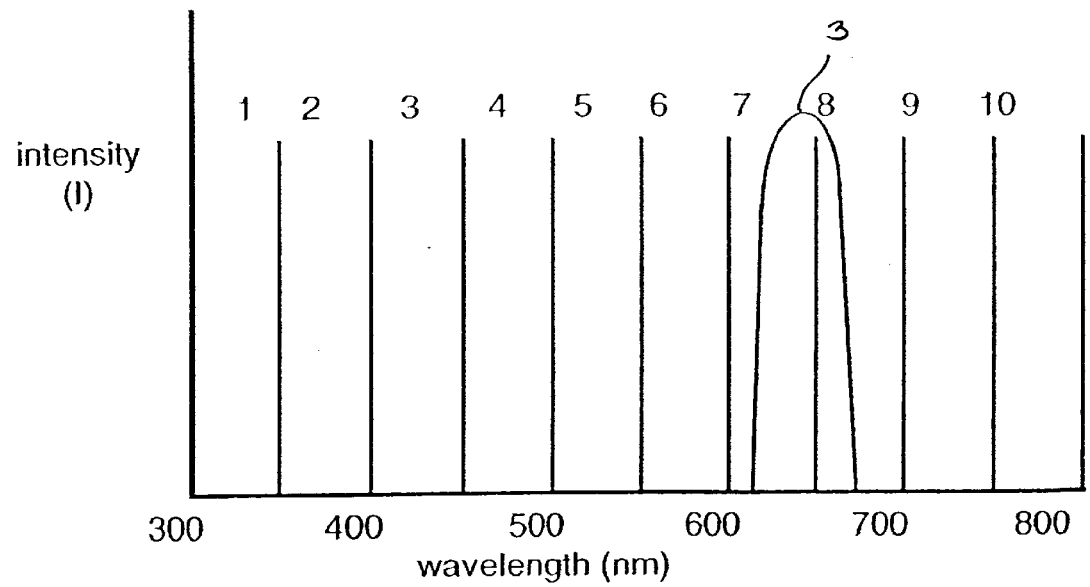
Figure 1C:
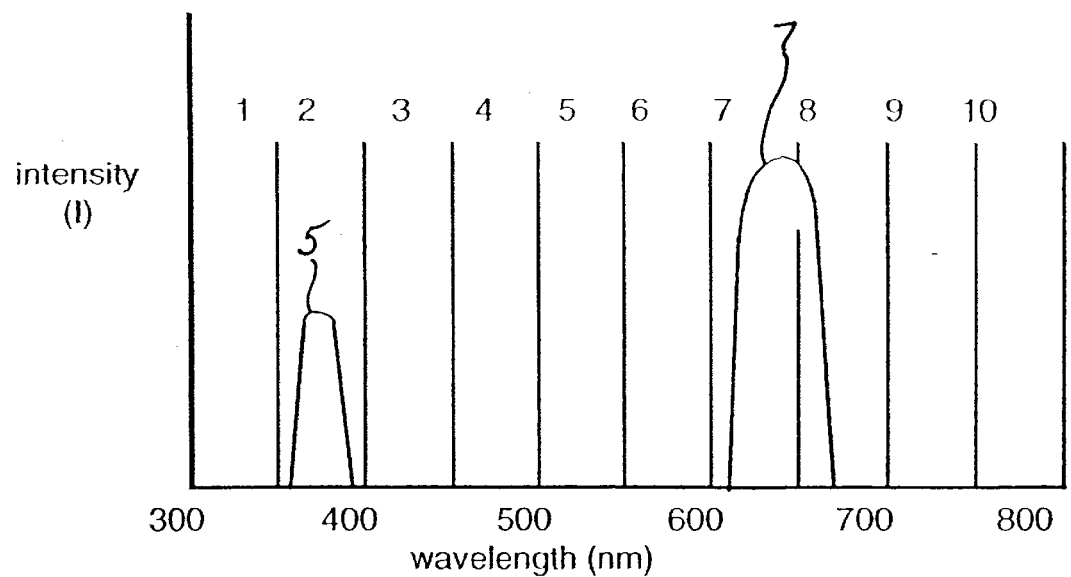
Figure 1D:
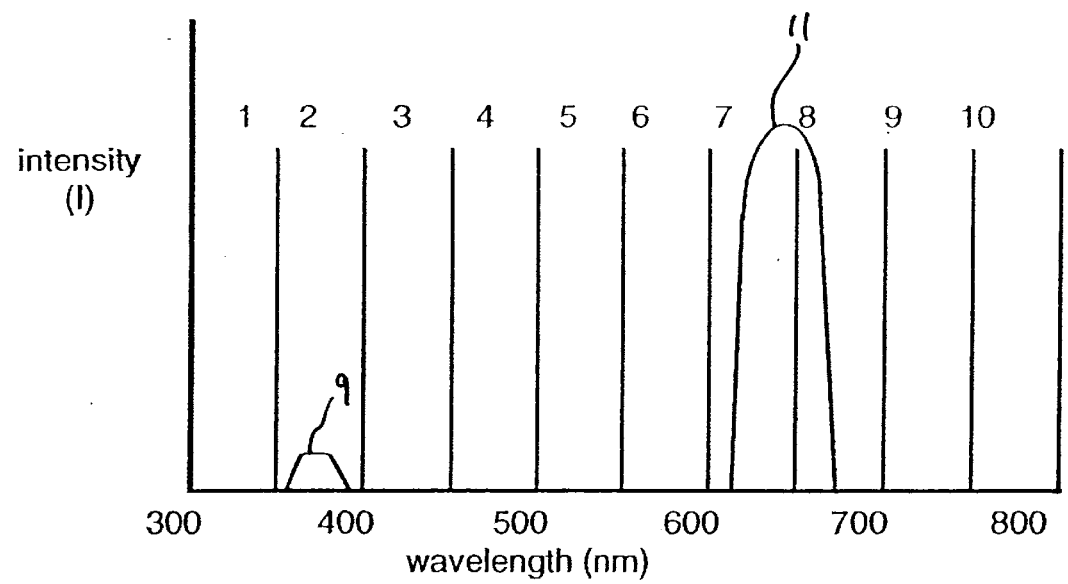
Figure 2A:
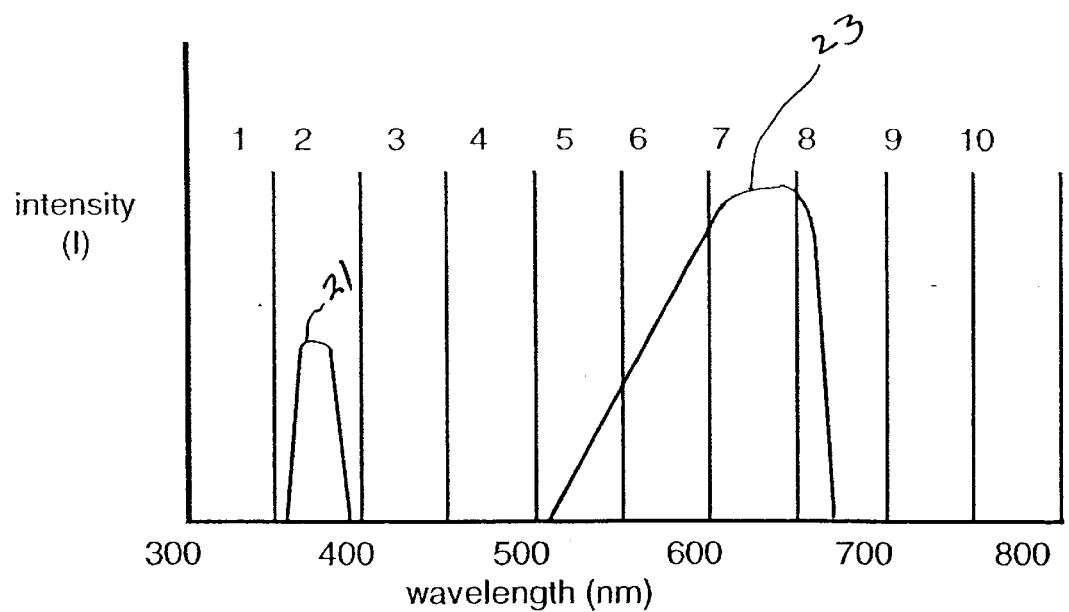
FIGS. 2a–2c illustrate nonadditive combining of spectral responses.
Figure 2B:
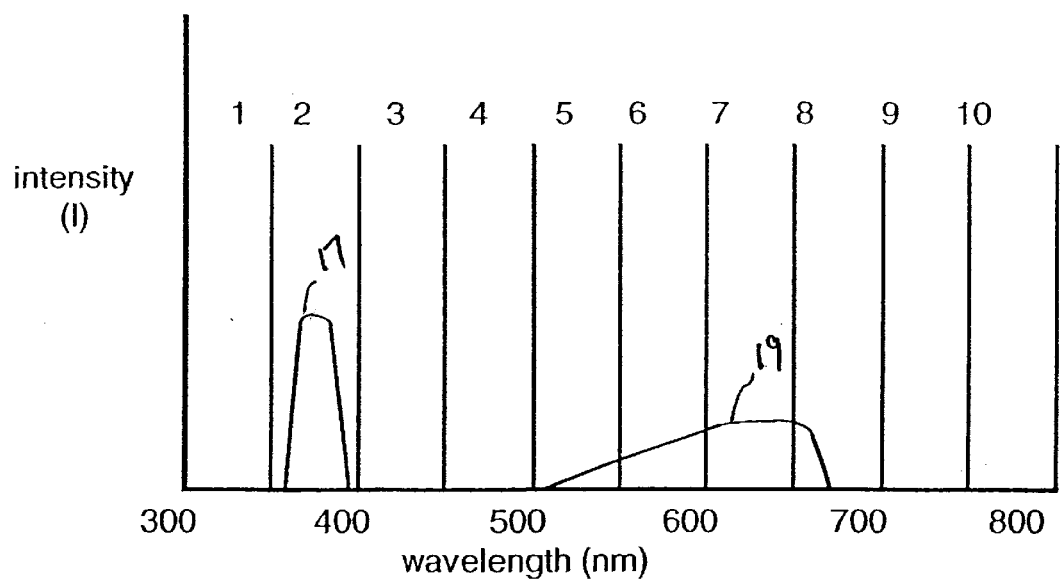
Figure 2C:
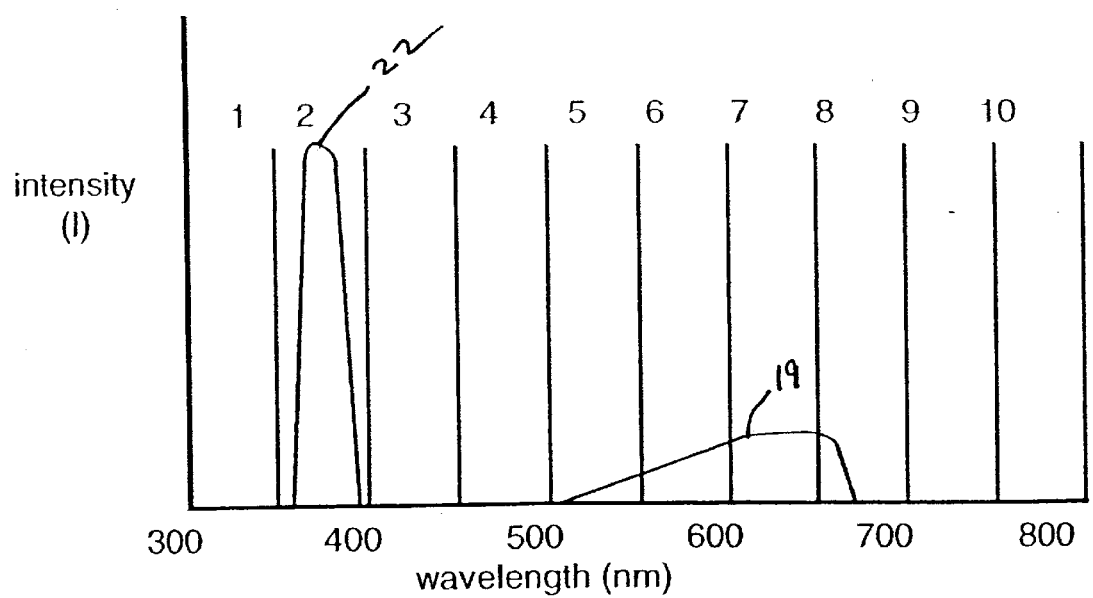

While the invention will be described in connection with specific and preferred embodiments, it will be understood that it is not intended to limit the invention to those embodiments. To the contrary, it is intended to cover all alterations, modifications and equivalents as may be included within the spirit and scope of the invention as defined by the appended claims.

Throughout the present disclosure, the present invention is described in connection with a set of ink components or ink composition, or a method of printing or method of verification, "comprising" or "including" specific components, or "comprising" or "including" specific steps. While the set or composition, or method, is described as including or comprising specific components or specific steps, it is contemplated by the inventors that the set or composition of the present invention can also consist essentially of, or consist of, the recited components, and that the methods of the present invention can also consist essentially of, or consist of, the recited steps. Accordingly, throughout the present disclosure any described set or composition or method can consist essentially of, or consist of, the recited components or materials, or recited steps.

An important part of the present invention, in security printing, is having a printing and read-out relationship that functions in the same manner as trap-door mathematical functions. These are functions where a mathematical operation in one direction is easy, but deriving the original operands from the final product is very difficult. The classical examples in mathematics are the factoring of integers composed of the product of two large primes, and reversing modulo N arithmetic.

A method of implementing difficult reversibility in the printing and read-out relationship utilizes combining different spectral responses of different materials, which have nonlinear color mixing characteristics, to make arrays of markings, each marking having a unique spectral response. Preferably, the printing uses inkjet ejectors of pigments and phosphors having the nonlinear color mixing characteristics, to make arrays of colored microdots, each dot having a unique spectral response.

While a dot (e.g., microdot) of a mixture of ink components having nonlinear color mixing characteristics falls within the present invention, preferably arrays of, e.g., microdots are used. One of the reasons for using arrays of microdots as the security printing object is that the dots act as optical intensity references to each other so far as automatically providing a relative average reference for intensity comparisons at a given wavelength. This allows use of a single filter, with a bandpass frequency randomly selected from a set of characterized wavelengths in front of a CCD camera, to be used as part of a reader. If a single dot were to be used, a more expensive reader, incorporating a multiple filter reader and a method of stabilizing the reader and the item to be read during the multiple image acquisitions, would have to be used. The use of a regular array of dots as the security object facilitates the use of low-cost readers.

Creating and characterizing a microdot having a unique spectral response by combining pigments in different proportions is easy. Taking the spectral response of this image dot and then attempting to determine from this information what pigments/phosphors, and what proportions of each, were used to make this dot (e.g., "reverse engineering" the dot), so that one can counterfeit the dot, can be made very difficult by the appropriate selection of base pigments/dyes. Utilizing computer controlled microdrop-inkjet technology adds another two layers of security; the first is that the very small amount of material used for each dot precludes easy direct chemical analysis of the deposited dots, and the second security factor is that microdrop-inkjet technology can be used to create very dense two-dimensional arrays of dots, all of which must be accurately replicated in order to provide a counterfeit.

The trap-door hard-reproducibility is based on the fact that by using mixing of materials according to the present invention, making a unique pattern and then, empirically measuring the spectral response of the resultant microdot array to make an authentication template, is a relatively easy task. However, given the spectral response, discovering the base pigments/dyes used and the proportions of the pigments/dyes used for each of the tens of thousands of dots in, e.g., a security label is a far more difficult reverse engineering problem when inks are used which nonlinearly color mix. Even if the individual pigments/dyes used were known, determining the exact proportion of each used to synthesize each dot in a multi-thousand element array can be made into an intractably hard problem in analytical, combinatorial chemistry.

Making the individual dots themselves optically cross-interact can make duplicating a microdrop combinatorial array even harder. An optically cross-interacting fluorescent cascade in which the emissions from dots can illuminate their neighbors and effect their neighbors' spectral responses can be made possible by utilizing ultraviolet illumination and a partially reflective coating applied over a close-packed dot array. This physically implements a process similar to cryptographic cipher block chaining, further enhancing the security of the microdrop authentication label. This is because the spectral response of each individual is now effected by all neighboring dots in a cross-interactive manner, with every other dot in the array. This makes duplication of any single dot by a counterfeiter far more difficult, since all of the neighbors of the dot must first be duplicated correctly in order to test to see if a spectral emission pattern of a counterfeit dot is properly matched to the pattern to be formed.

In order to provide the printed object and verify authenticity, four technical elements are preferred to implement the present invention:

(1) Nonlinearly color (generally, spectral response) combining inks;
(2) Hardware to print the pattern;
(3) Low-cost computer interfaceable imaging hardware to read the pattern; and
(4) Software to verify the pattern.

Elements (2), (3) and (4) can be implemented utilizing, respectively, industry-standard inkjet printers, CCD/CMOS video conferencing cameras, and standard pattern recognition and networking software. Thus, the present invention is amenable to use of low cost and widely accessible hardware and software, to be used in combination with the nonlinearly color mixing inks.

While not to be limiting, nonlinear spectral response combining can be achieved by utilizing inks which exhibit multiple fluorescent absorption and re-emission bands. Pigments/dyes which block out wavelengths near fluorescent absorption lines will affect the spectral response at wavelengths away from where their pigments/dyes directly effect the absorbed or reflected light. Light emitted by one fluorescent band conversely can be absorbed and re-emitted at other colors. The characteristics of a fluorescent response of a dye can be made to change depending upon the presence of absence of trace non-light emitting chemicals.

Nonfluorescent chemically active dyes/pigments which react together when mixed can also be used to achieve a nonadditive spectral response when combined.

Use of inks which exhibit nonlinear spectral response combining prevents using linear color response assumptions and straightforward linear algebra to reverse analyze (reverse engineer) the composition of the individual printed dots.

As a preferred technique for providing the markings is through use of an inkjet printer, it is preferred that the inks are inkjet inks (that is, can be applied by an inkjet printer). For example, use of pigments of relatively large particle size are not preferred, since they cannot be utilized in an inkjet ink.

When forming an inkjet ink (for example, selecting at least two dyes/pigments from a set of ink components), the components can be chemically reactive with other dyes/pigments in the set or with noncoloring chemicals. Desirably, but not to be limiting the nonlinearly additive spectral response of the combination has a percentage deviation, from a predicted spectral response when linearly additively combining spectral responses of the invention, components of the mixture, which is greater than 20% (that is, the deviation at a specific wavelength, as a percentage of the theoretical or predicted, is greater than 20%).

Preferred inks to be used as inkjet inks, for the present invention, are from a class that is described by their manufacturers as metachromatic, that is, variable in color depending upon their chemical environment. Examples of such colorants are Safranin O, Azure B, Toluidine Blue, Acrydine Orange, Methyl Violet and Bismarck Brown Y. Other inks that are usable are those which in combination with other selected inks directly chemically react with each other, such as Sodium Fluorescein and Brilliant Green, which when mixed precipitate the colorants out of the solution. A third class of inks are those such as Rhodamine B and Brilliant Green which are fluorescent dyes which in combination change each other's absorption and emission spectra such that nonlinearly additively combining the spectral responses occurs.

Not all of the ink combinations are required to nonlinearly additively combine, but there should be a sufficiently large percentage of the mixtures which do exhibit nonlinearly additively combining of spectral responses that an attempt to use the assumption of linearly additively combining of spectral responses to replicate a microdot array will not produce an array which will pass inspection. For example, if a 90% accuracy rate is required for a dot array to be validated, only a little more than 10% of the dot combinations are required to exhibit nonlinearly additively combining at a level greater than 20%.

If nonreactive solids are used, as opposed to chemically reactive dyes and pigments, in the inkjet ink, the particles preferably have fluorescent cross-interaction with other pigments/dyes such that nonlinearly additively combining of spectral response, at a percent deviation from linear of greater than 20%, can be achieved.

In summary, an ink set to be usable for the purposes of the present invention, printed using an inkjet printer, must contain pigments or dyes which are (1) ejectable from inkjet devices; and (2) have a percentage of the possible dot mixtures, greater than the error criteria for array rejection, which nonlinearly additively combine at a percentage greater than the resolution, of the system, for the spectral response of the mixtures.

While in the foregoing inkjet inks have been discussed, the present invention is not limited thereto and, for example, non-inkjet inks based on fluorescent solids can also be used. Such inks can, preferably, be deposited by color laser printers or dry contact printing.

FIG. 3 schematically illustrates the formation of the ink composition 27 from ink compositions 25a–25e.

For dry printing such as for use in laser printers, without post-development, the pigment particles desirably have fluorescent cross-interactions with overlapping absorption and emission bands that have interactions sufficient to produce nonlinearly additively combining of the spectral responses at quantitative levels such that deviation of greater than 20% from predicted linearly additively combining of the spectral responses is achieved.

Conventional press and roller contact printing techniques, while not as ideal as inkjet methods for implementing this invention, can also be used to print security labels based on this combinatorial mixing technology. One example is the use of contact printing techniques for printing a large number of identical security tags. In one example of how this might be implemented, a set of premixed inks from a set of inks designed to nonlinearly additively combine can be applied from a multireservoir inking pad onto the selected area of a roller or flat plate type printing press that contains the image of the security label.

Post-development of non-inkjet inks is possible by depositing powder-based pigments onto paper and then depositing solvent microdots over selected regions to allow chemical reaction. Alternately, the dry-printed security label can be placed in a vapor-filled chamber to allow deposited dyes/pigments to chemically react with each other.

Additional mechanisms for producing nonlinearly additive color mixing can also be used. For example, chemical cross-reactions between dyes, and between dyes and noncoloring chemical compounds mixed with the dyes, can be utilized for providing the nonlinearly additively combining of the spectral responses; and chemical cross-reaction between dyes that, for example, precipitated out colorants leaving a clear solution with a dark colored solid powder, can also be used.

For applications where a plurality of identical documents (e.g., identical security labels) are to be printed, the printer technology and materials used must allow reproducibility to be achieved. Where a dye that mixes so unpredictably with another dye due to environmentally dependent chemical reactions, that additions of this dye yield nonreproducible spectral color shifts, would be a poor one to use where reproducible effects are necessary. A good dye would be one that mixes nonlinearly but with a predictable set of chemical reactions that consistently shifts the spectra by incremental amounts of arbitrarily small size that are a function of the percentage of the dye that is present. The key to this preferred component where a plurality of documents with identical security labels are required, is that the shift in spectra be a quantitatively repeatable function of the amount of dye added.

However, combinations of components providing unpredictable results when mixed, can be used for printing security patterns that need not be reproduced, and may in fact add a layer of security if the security pattern need only be printed once.

The anti-counterfeiting technology according to the present invention is dependent for its effectiveness, in part, on the difficulty of replicating a dot made by combining a discrete set of inks given only its measured spectra. The first criteria that this method preferably meets, to be effective, is that the number of possible mixtures be large enough that a counterfeiter could not simply print a massive dot array containing all possible mixes, scan them, and then make a look-up table. Using current technology inkjet printing parameters, the present technique can be made secure against this form of brute force attack. That is, current inkjet printers use up to 7 different ink colors in their print heads. If each of the inks have 256 levels of detectable spectral distinguishability, then a 7-color inkjet can be made combinatorially secure from brute force attack. The 16-level system is vulnerable, since printing an array of all possible dot combinations at the resolution of current top-of-the-line printers (approximately 1000 dpi) would only fill about four standard size pages and require four gigabytes of data to store at sixteen scanned wavelengths. With printers using 16 different color inks, both 256-and 16-level systems are secure against brute force attacks based on printing out all possible combinations, scanning them at all wavelengths, and making a look-up table.

As seen from the foregoing, it is desired that printers using increased numbers of different ink colors in their print heads, with increased resolvable color change levels per color, be used, in order to be secure against brute force attack.

Security can be even further increased if the composition of the base inks (for example, 16 base inks in a preferred embodiment) were kept secret or they were mixed from a custom kit by the end user.

In order to defeat using linear mixing to replicate an ink dot array, the nonadditive color mixing inks must controllably introduce nonadditive changes to the spectra at a percentage change level greater than the brightness resolution range of the viewer or the smallest incremental change in spectra due to the mixing resolution of the dyes. Otherwise, the nonlinear deviations from the predicted spectra would be lost in the system noise and be indistinguishable from linear mixing.

CCD and CMOS monochrome cameras, a typical type of reader of the pattern, are digitized typically at 8-bit (256 levels) and 12-bit (4096 levels) brightness level. Thus, the optical system is not likely to be a limiting factor. The more serious problem will probably be the limit given by the smallest incremental addition of ink to a dot that would give a repeatable measurable change in its spectra. The chemical mixing resolution of the dyes (defined here as the smallest change in deposited dye that will produce a repeatable detectable distinct spectral change), rather than the intensity resolution of the optical system, is thus likely to limit the applicability of the present technique. If the system resolution is at the 8-bit (256 intensity level) range, then nonlinear mixing on the order of a deviation of 0.5% or more from predicted linearly additive combining will cause the predicted value to deviate measureably from what the actual value of the optical absorbance would be. A 4-bit (16 level) system will require a nonlinear color mixing deviation of greater than 6% from the predicted linearly additive value in order to defeat counterfeiting methods based on using linear algebra to calculate from the scans of the spectra of the individual inks what proportion of each ink is needed to replicate a given spectral pattern.

The preferred minimum nonlinearity of the inks is therefore between 0.5% and 6%, depending upon the combined optical and chemical mixing resolution of the system. Since these percentages are based upon the percentage nonlinearities to match a smallest incremental change in the chemical mixing resolution, the actual preferred nonlinearity will probably need to be greater, to take into account non-ideal conditions in actual use. A 10%–20% deviation between the measured spectra and the spectra predicted upon linear mixing is probably sufficient to guarantee secure implementation according to the present technique.

In any event, a percentage deviation greater than 20% would be sufficient to guarantee secure implementation.

The spectral response (e.g., reflectance, fluorescence and/or absorption, but not limited thereto) of an object does not have a one-to-one correlation with color as perceived by the human eye. Many different combinations of spectral lines can be perceived by the human eye as being the same color. Computer display and printing technology depend upon this limited tricolor response of the human eye to form visually acceptable replicas of objects and scenes that have far greater spectral complexity than the limited pigments of a printer or phosphors of a cathode ray tube can synthesize. The scanning, display and printing hardware in personal computer hardware is incapable, because of basic hardware limitations, of replicating the true spectral response of real world objects. This makes conventional scanners and printers useless for analyzing or counterfeiting, in connection with the technique of the present invention.

As to printing a pattern on an object, a preferred embodiment is to dispense and mix the inks at the location of the final printed dot using inkjet technology. The lowest cost implementation would be for custom print heads or ink cartridges containing custom security inks, which are compatible with industry standard printers. Print head technology such as that of Hewlett-Packard Corp., in which the ink reservoir is integral with the ejector, is preferred. A printer that allows changing of the print head while maintaining a paper position index will allow the insertion of custom high-security print heads, where restricting access to the inks is part of the total security system. Other methods for making the pattern, such as mechanical contact deposition of the inks and xerography, while possible, are less ideal.

Preferably, some sort of protective overcoating is provided for the printed security label. Such a protective overcoating could be a clear plastic thermal laminate, a clear adhesively attached plastic sheet, or a clear printed-on overcoat, but is not limited to one of these illustrative overcoats. Application of the protective overcoat may effect the optical properties of the ink mixtures; and for this reason, the read operation to generate the matching template should desirably take place after the protective overcoating is applied.

The most straightforward hardware for performing verification of authenticity of the pattern utilizes a monochrome solid state (CCD or CMOS) camera with a pixel density sufficient to resolve the printed security dot array. A filter wheel over the illumination source can be used to vary the wavelength which excites the dots. A filter wheel allows a selection of different wavelengths to view the dot array. The illumination source used should optimally have significant emission in the blue and ultraviolet, in order to properly excite, e.g., dots which contain fluorescent compounds. The frame rate of commercial low-cost solid state cameras is usually 30 Hz, which is more than adequate for the present application. The limited frame rate actually needed for verification allows great flexibility in cost optimizing the interface from the imaging hardware to the computer.

Figure 6:
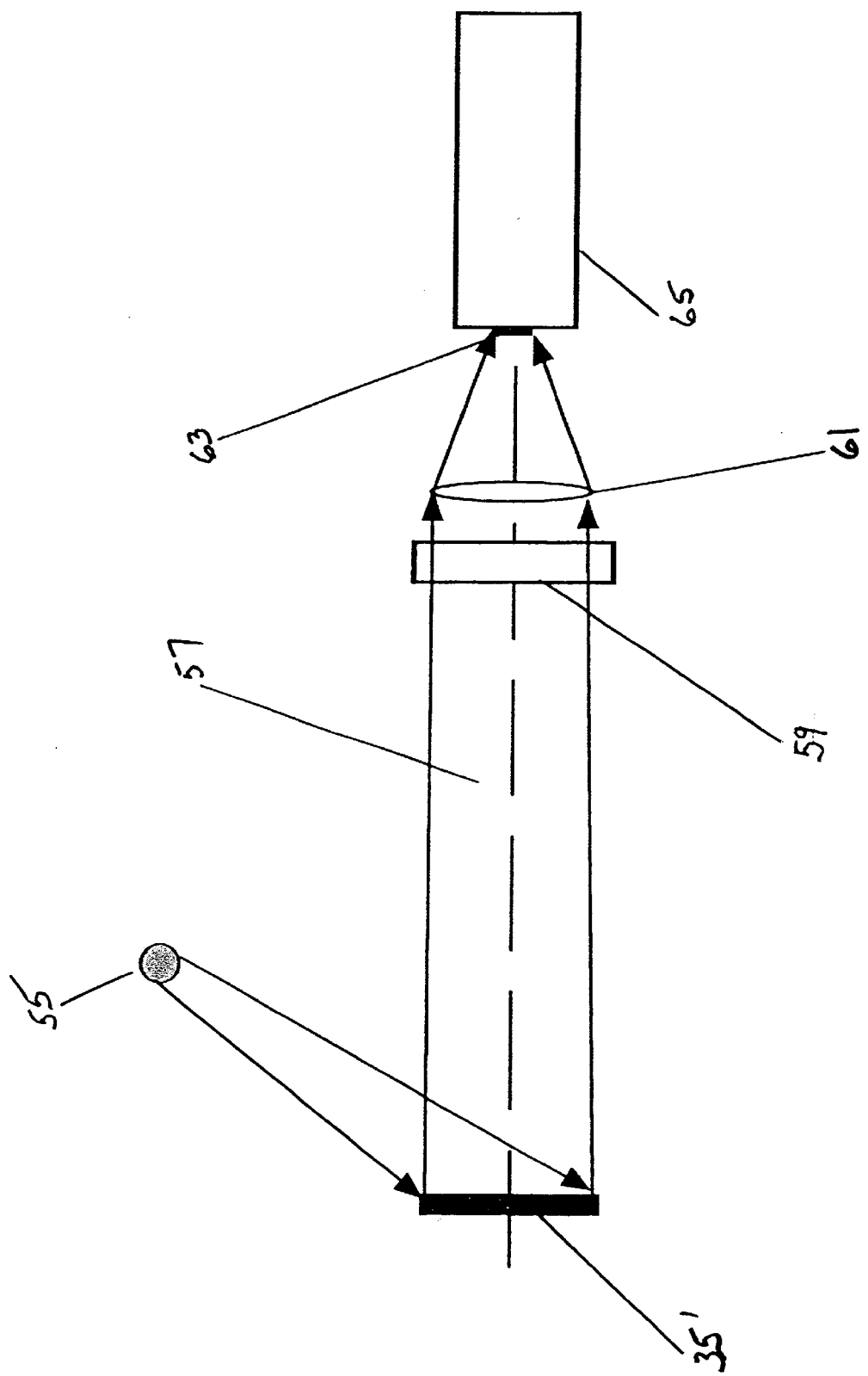
FIG. 6 illustrates a reader used for verification of authenticity.

FIG. 6 illustrates schematically the reading of the spectra of a color pattern on a document. Here, the term document means not only a paper document, but any object such as a clothing label or an electronic part or a mechanical part upon which a label has been printed. This apparatus shown in FIG. 6 is a reader used in verifying authenticity, and includes CCD camera 65 or equivalent, focusing lens 61 and spectral filter device 59 (for example, a color filter wheel). Also included is light source 55; light from light source 55 irradiates document 35' having a pattern (label) thereon, and light 57 coming from the pattern on the document passes through the spectral filter device 59 and forms a spectrum filtered image 63 of the pattern on the document, which registers on the camera 65. The light passing through the lens system is separated temporally into wavelength segments, thus the camera reads and transmits a time series of different color segments of the pattern. The illumination of the pattern and the light 57 coming from the pattern may be of various types, such as fluorescent light from a visible light source; fluorescent light from a ultraviolet source; ultraviolet light from an ultraviolet source; diffuse reflected visible light from a visible light source; specular reflected light from a visible light source; and Raman scattered light from a visible light or infrared source. Several kinds of light sources might be used; for example, an incandescent lamp, a gas lamp, a laser or an LED, for example.

Pattern generation, using, for example, an inkjet printer, can be achieved as follows. For example, a seeded random number generator can be used to select the mixing used at each dot. For low security applications, a key phrase, the time of day or a selection of the contents of often used memory locations, can be used as the seed. For higher security application, hardware seed generation utilizing thermal noise, atmospheric radio noise or radioactive decay can be used. For maximum possible security, each dot could have its mixing proportions determined independently by a hardware-based random number generator. The user will then select the size, shape and dot density of the security pattern to be printed. The pattern is then printed out, and the mixing ratio used for each dot is stored.

Figure 4:
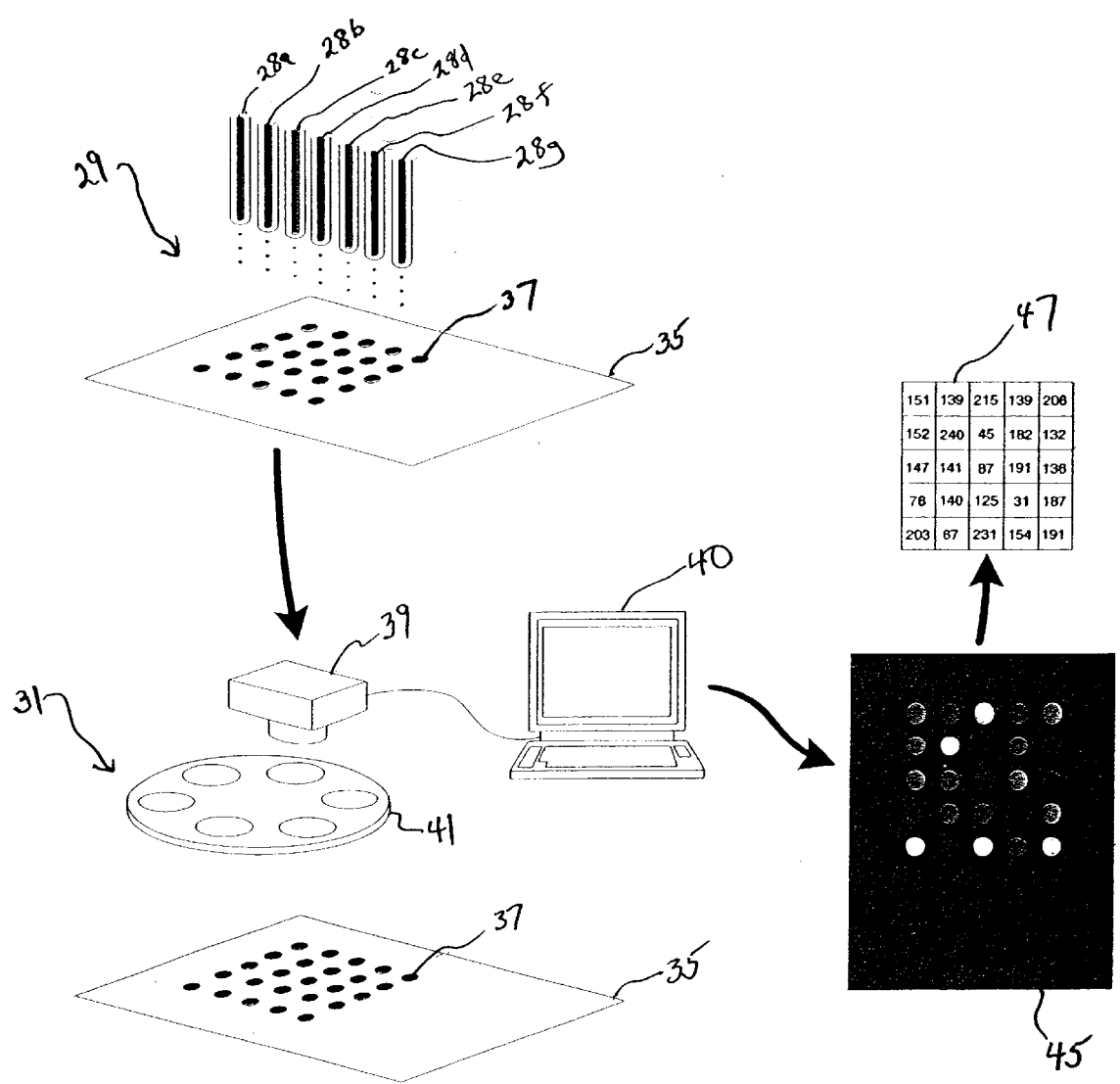
FIG. 4 illustrates schematically the forming of markings on a substrate according to the present invention.

Creation of the pattern is shown, schematically, in FIG. 4. That is, printing is shown at the location indicated by reference character 29, the different ink components being shown respectively by reference characters 28a–28g. The mixture at each dot can be determined by a random number generator. Shown at reference character 31 is a reading station, having monochrome camera 39, filter wheel 41 and document 35 with markings 37. Results measured by the camera 39 are passed to computer 40. A monochrome image 45, having a separate image for each filter, is stored as a matching template 47, as a normalized intensity contour.

Figure 5:
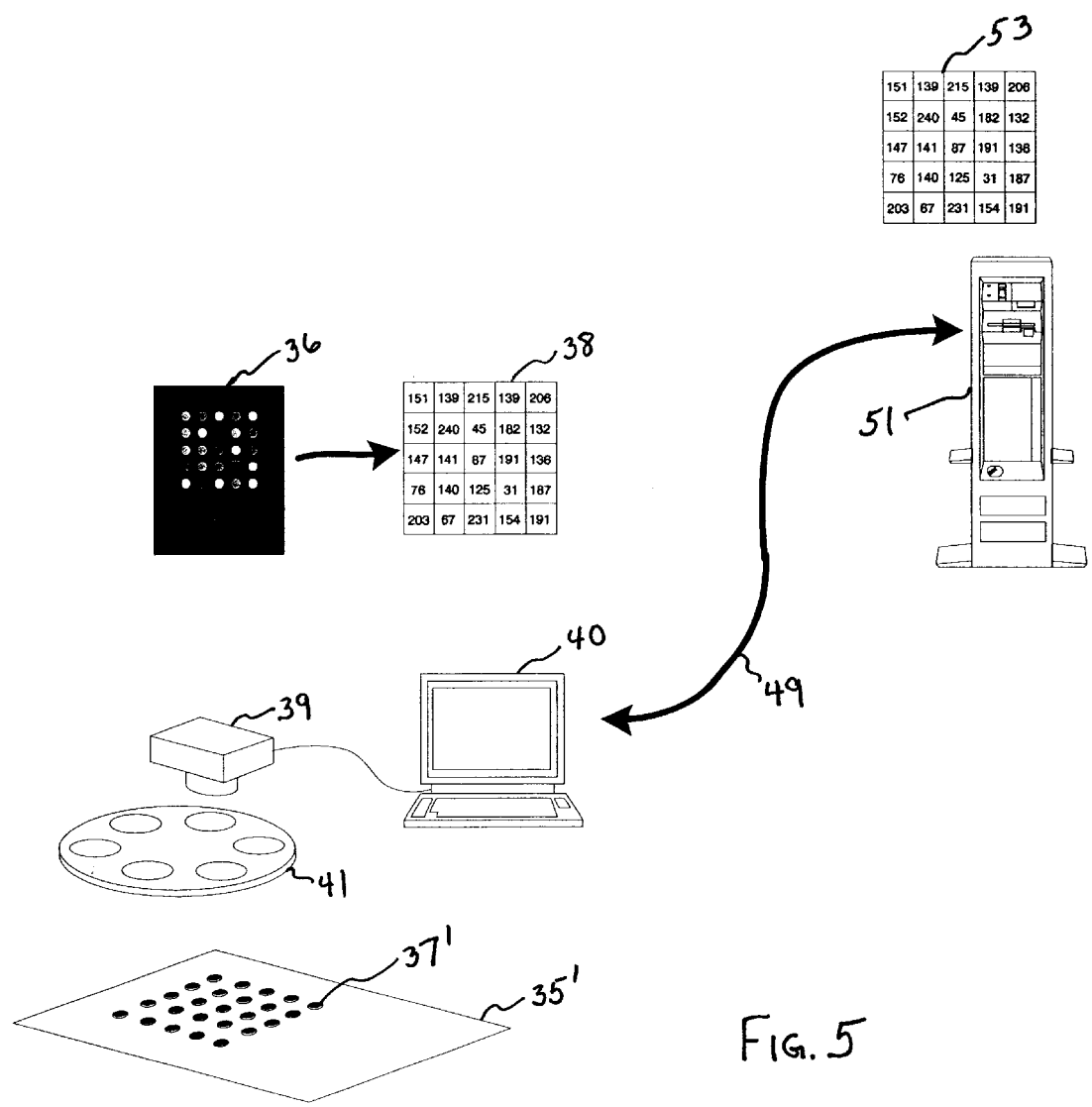
FIG. 5 illustrates schematically the verification of authenticity of a printed object, according to the present invention.

This template can then be used to verify authenticity, as shown in FIG. 5. That is, FIG. 5 shows document 35' whose authenticity is in issue, having markings 37' thereon. Light from markings 37' pass through filter wheel 41 and form a separate image for each filter on camera 39. The images from the camera 39, which represent measured array intensities, having a separate image for each filter, are shown by reference character 36, and are converted to numeric contour maps 38, which can then be uploaded via computer 40 to server computer 51 by way of, e.g., the Internet 49; and the numeric contour maps 38 are compared with a numeric array 53, as a matching template, at server computer 51. If a substantial match is detected, verification of authenticity is then sent back by the Internet 49; while, if a match is not found, the document 35' is rejected, as not authentic. Thus, according to the present invention the computer comparing the matching template and measured array can be at a remote location from where the measurement takes place; and the computer can be used to make comparisons from documents analyzed at many different locations.

According to a preferred embodiment of the present invention, the dot patterns are verified by being illuminated with monochromatic light and imaged through different monochromatic filters with a computer-interfaced CCD or CMOS camera. At each viewed wavelength the relative brightness of the dots is stored in the form of a two-dimensional contour map. Comparisons of these contour maps with reference templates made by imaging the original dot array are used to verify the authenticity of the security label. The number of different illumination and viewing wavelengths used can be increased with the level of security required. Depending upon the level of security required, the dot pattern can be stored and matched at each wavelength as either a threshold on-off pattern of dots or as an analog intensity profile (contour plot).

Monochromatic light is not required or is even desirable in some cases, for instance for nonfluorescent absorption-based dyes. What is needed, however, for implementation of the present invention is a light source with a well defined spectral content identical in both the readers used to make the matching templates and the readers used out in the field to authenticate these security labels.

A document protection system that requires a prohibitively expensive read-out system is of little use in the commercial world. The recent availability of low-cost image capture cards and inexpensive miniature CCD and CMOS video cameras makes possible an affordable method of verifying the authenticity of a, e.g., microdot combinatorial array. Using current technology, the camera and frame grabber costs are on the order of $200.00. Narrow band monochromatic filters can sell for, e.g., $10.00–$20.00 each at wavelengths justifying mass production. The prices of these components have been rapidly decreasing. Connecting imaging hardware to personal computers has recently become even cheaper with the new high-speed serial data interface (the new industry standard high speed serial interface's official designation is IEEE-1394 "FireWire"). The cost of an optical reader, depending upon the level of sophistication required, is in the low hundreds of dollars. The digitization time for a single image with current technology low-cost cameras is on the order of 1/10 to 1/30 sec. Thus, the present invention can provide speedy verification, at low cost.

It is not necessary to publicly publish the spectral contour plots of the authentic documents. Verification of authenticity can be done via the Internet or via local intranets. First, a series of images are acquired at different wavelengths. Next, at each frequency the imaging computer converts the imaged dot array into either a contour plot or a pattern of on-off dots. These extracted patterns are uploaded to the authentication computer that has stored the spectral template for the true document. If the pattern matches better than a given correlation coefficient, then a verification message is sent back over the network to the computer which read the document in question. The potentially unique pattern of each document can also be used as a covert serial numbering useable for tracing the use of certain classes of secured documents such as access passes.

Though the preferred implementation is to have the reader convert the raw graphic images taken by the camera into a numeric contour map, it is also possible, if enough bandwidth is available, for the reader to send the raw graphic image to the verification computer which would then be required to perform both the contour map extraction from the raw image and the comparison of this contour map to its internal matching template. One major disadvantage of sending the raw graphic image is the amount of data to be uploaded is from 10 to 100 times that required for uploading a preprocessed numeric contour map. An additional problem is that the verification server will have a much higher processing load. This can adversely effect transaction throughput when this system is used in a high volume commercial application. The advantage, however, is that the reader can be made simpler and cheaper. For applications where the expected number of transactions per unit time is expected to be low, sending the raw graphics images as is to the verification computer may be a viable option to cut the cost of the readers.

The cost of digitally archiving authentication templates is low even when the data is stored as multiple contour plots. A 100 by 100 array read at 16 wavelengths with 8-bit resolution generates 160 Kbytes of raw data which can require, e.g., about two cents worth of hard drive space to store. Using commercial ISDN lines, this data block could be transmitted to a verification server in less than a tenth of a second.

The authentication pattern need not be a simple rectangular array. The dots could also be printed such that they form the shape of a company trademark or logo, or are printed such that they form alphanumeric characters.

If covert security is needed, or there is a desire not to deface the appearance of a protected object or document, a spatially sparse array of, e.g., microdots can be printed, relying upon the small diameters of the microdots for invisibility. Alternately, visually transparent inks excited by ultraviolet light could be formulated. The sparse dot and transparent dot techniques could also be useful as an anti-tamper security protection overlay which can be printed on top or original documents for assuring that photographs and signatures, for instance, have not been substituted or altered.

In operation, initially an ink cartridge is selected by the user. If duplication of the pattern at future dates by other authorized entities is necessary, then the inks will be selected from a standardized set. If high security is desired for creating authentication marks that will not require that the marks be reproducible by publicly available hardware, custom mixed inks can be used as the base combinatorial set. For low-cost applications, the security ink cartridge can be made hardware-compatible with standard cartridges of inkjet manufacturers, so that mass-produced, low-cost commercial printers can be used. Alternately, for high security applications, ultra-high resolution print heads and printers could be custom made.

As indicated previously, a seeded random number generator can be used to select the mixing used at each dot. The user will then select the size, shape and dot density of the security pattern to be printed. The pattern is then printed out and the mixing ratios used for each dot is stored.

The printed pattern is next placed in the user's multi-wavelength imaging verifier and either contour plots or thresholded dot patterns are measured and stored, creating a matching template. The number of wavelengths these contour plots are taken at, and the wavelengths used for illumination and imaging, are determined by the intended use of the object. A standardized public set of illumination and viewing wavelengths could be used for verification of consumer goods, collectibles and low-security financial documents. A smaller subset could be used for applications such as amusement park ticket verification in which the resources devoted to counterfeiting is likely to be low. For high-security access control and verification of high value documents, an extensive and proprietary set of measurement wavelengths could be defined.

An object to be verified is imaged on a reader which, depending upon the application, can be a video camera assembly with rotary filter wheels for selecting illumination and viewing wavelengths. Alternately, for documents with a preknown size, such as identification cards or event tickets, the document could be fed into a custom reader. Contour plots are taken for each wavelength and normalized to 256 gray levels. These contour plots can be compared with an internal template and matched, or sent out over a computer network for verification. Remote instantaneous anonymous verification over the Internet could be used, for example, to combat counterfeiting of name brand consumer goods, collectibles and industrial components. A response either from the internal database or over the computer network can either be a binary (valid-not valid) response or a confidence level.

As a preferred implementation for high security use, an inkjet printer with multiple individually usable loadable color cartridges is used. The number of ink channels preferably is on the order of 16. The printer is of a type which is custom manufactured for this purpose and differs from consumer-grade printers by having a higher dpi (dots per inch) printing resolution, a larger number of ink channels and individually selectable ink reservoirs for each color. Another modification needed for a printer optimized to implement real-time combinatorial mixing is that it is capable of being commanded to deposit ink drops on top of previously printed ink spots. Current printers produce different colors by printing a matrix of non-overlapping dots composed of the primary colors, relying upon their small size and proximity for the human eye under normal viewing conditions to blend them together. The internal-print head control firmware is thus not set up to print ink dots on top of previously laid-down dots.

The set of inks to be loaded into the printer for a particular printing job is selected by the user from a much larger set, and is then loaded into the printer. A record is kept of which subset is selected. This adds to the permutation problem for a counterfeiter.

Proprietary inks using exotic precursors can be used to add an economic denial-of-resources layer of security on top of the combinatoric security method. The preferred inks are from a class that is described by the manufacturers as metachromatic, that is, variable in color depending upon their chemical environment, examples of such colorants being Safranin O, Azure B, Toluidine Blue, Acrydine Orange, Methyl Violet and Bismarck Brown Y; but other inks that are usable are those which directly chemically react with each other such as Sodium Fluorescein and Brilliant Green which when mixed precipitate the colorants out of solution. In addition to metachromatic inks and chemically reactive inks, there are inks, which produce nonlinearly additively combined spectra by cross-interacting fluorescent absorption and emission lines, which are also suitable for implementing the present invention.

In this high-security implementation, the mixing ratios for each microdot are optimally determined by a hardware-based random number generator. Such hardware based random generators can use sources such as atmospheric radio noise, radioactive decay or thermal noise, and this hardware random number generator is used to determine the proportion of each ink to be applied to each spot. This information could be deleted immediately after printing if there is no need to replicate the microdrop array security label. The security label formed is as large and spatially dense an array of microdots as is physically possible to print onto the secured object or document. In high security implantations, each document or item to be protected receives a unique pattern, and a laminated covering is desirably applied over the pattern to prevent environmental degradation and deter attempts at direct chemical analysis of the microdots. After the protective lamination is applied, the array is characterized at multiple wavelengths, some publicly disclosed, some kept secret, and this matching template information of this array is stored at each verification computer or each verification device. In principle, even making this data public should not compromise the security of the object. The microdot array can be imaged at all wavelengths it was originally characterized at and not just some small subset as might be done for low-cost commercial readers. Verification of a match with the template is done via multiple secure Internet server sites or locally secured intranets to minimize the chance of receiving a falsified verification by hackers. Public key cryptography could be used to verify the identity of the verification authority.

For low-cost implementation, various modifications can be used to reduce cost, for example, for applications requiring only short-term security such as securing amusement park tickets or applications not likely to economically attract sophisticated counterfeiters. Thus, software-based random number generation can be utilized, along with ink cartridges that are compatible with standard off-the-shelf consumer quality printers, with the printers being modified only in that they utilize nonstandard ink cartridges and custom software printer drivers. Imaging can be performed at only one wavelength, utilizing a fixed filter mounted in front of the camera; if the single wavelength is chosen at random, it can serve as a low security check on the authenticity of non-critical items. Authentication can be implemented locally via data stored within the reader or via computer networks.

In contrast to conventional security printed techniques which rely upon restricting access to hardware and materials, the technique according to the present invention, using combinatorial microdrop array printing, produces difficult-to-replicate objects by using a more cryptographically oriented approach that makes duplication of the security pattern dependent upon access to a data file or an information key. The security object printed using this method is an array of dots, each dot having a unique spectral response. The necessary difficulty of duplication by inspection of the printed array is physically implemented by printing the, e.g., security label using multiple inks ejected in different proportions to create each dot in the array. For example, these inks can be of a class that when reacted together they nonlinearly additively combine their spectral responses. The nonlinearly additive combining is used to make it difficult to determine from the end spectral response of the mixture which inks and what proportions of each ink were used to make each dot. The inclusion of multiple cross-interacting fluorescent compounds in the different inks can produce very complex spectra which makes replicating the complex color response of each dot virtually impossible unless the exact same inks in the exact proportions are used.

Attempting to create a brute-force, look-up table to cross correlate all possible mixtures with their spectral responses is not practical, due to the large number of possible ink permutations. For example, the number of different ink mixtures producible even using current consumer-quality inkjet printers having 7 different ink types and 256 different intensities, is in the $10^{14}$ possible permutation range . Thus, it becomes very difficult to reverse-engineer each dot.

Moreover, the sheer number of dots to be replicated is another security factor. The printed dot size of current commercial printers is small enough to allow the creation of very dense dot arrays in small areas. Printing a ten thousand dot array in a one square cm area, for instance, is well within the capabilities of current printers. The advertised 1440 by 720 dpi resolution offered on mid-priced commercial color inkjet printers in fact implies that a one square inch security tag could contain up to one million dots. Even a relatively sparse 100 by 100 security array would contain 10,000 dots with individually unique spectra, all of which must be duplicated by a counterfeiter. In addition, the very small size of each printed dot, less than a tenth of a millimeter in diameter, for example, makes an attempt to do a direct chemical analysis of each printed dot very difficult.

A low-cost means of reading these arrays can be implemented by using monochrome (CMOS or CCD) cameras to view the dot arrays through multiple narrow band filters. At each wavelength the relative intensities of each dot in the pattern can be digitized, and the original images transformed into two-dimensional intensity contour plots. These plots can be used to make reference templates, and as data inputs to be compared to the original references.

Figure 7A:
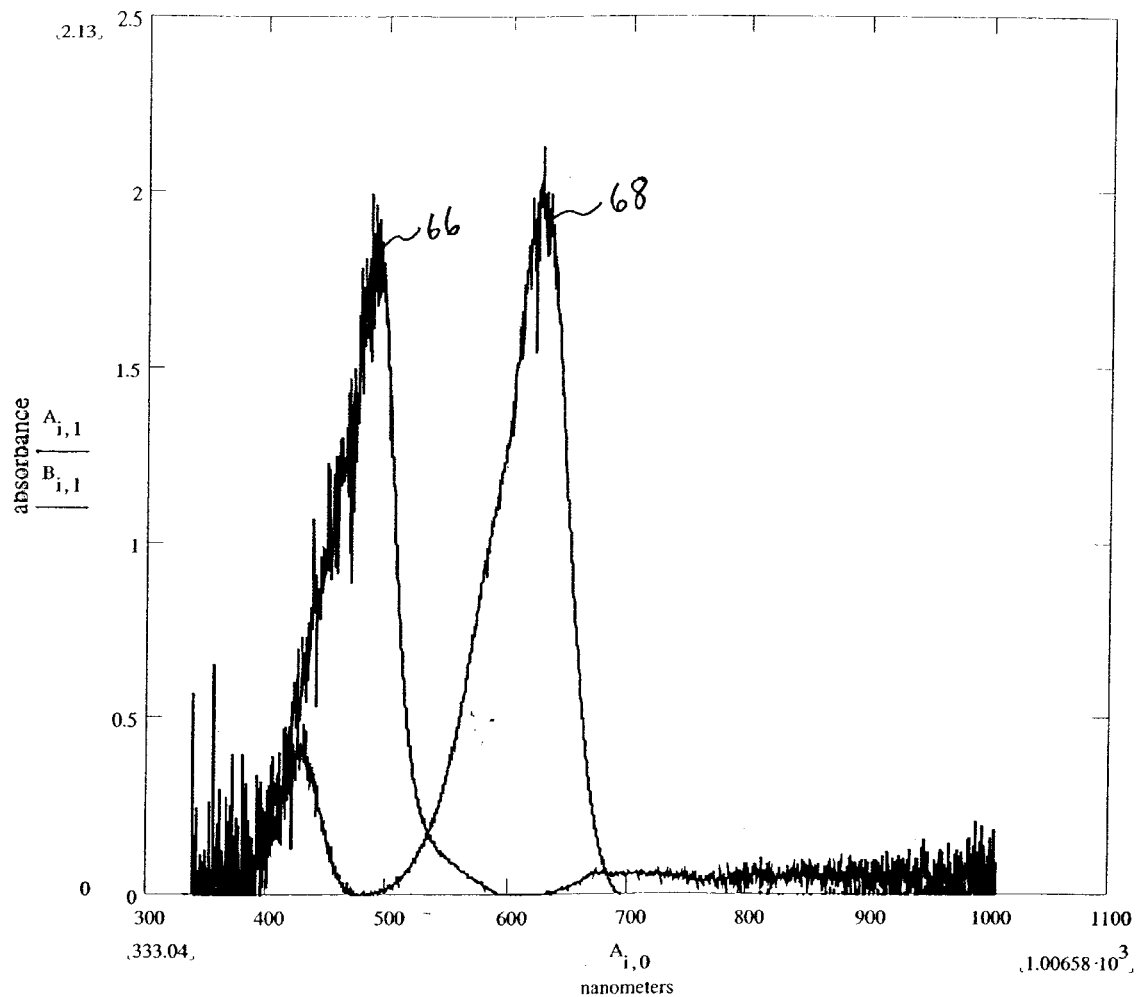
FIG. 7a is a graph showing respective absorbances, at different light wavelengths, of Sodium Fluorescein and Brilliant Green individually.
Figure 7B:
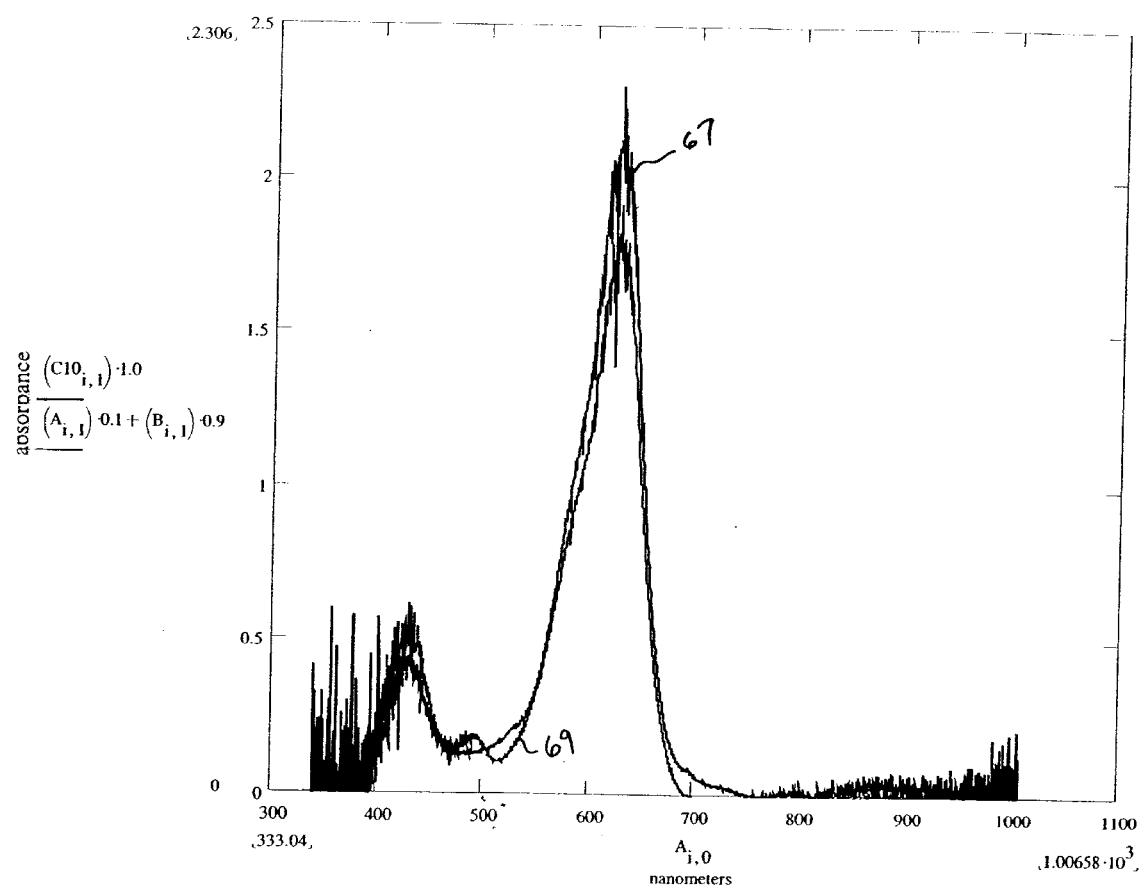
FIGS. 7b–7j are graphs showing absorbance, at different light wavelengths, of various mixtures of Sodium Fluorescein and Brilliant Green, as compared to a predicted (theoretical) linearly additively combining of absorbances of such mixtures of Sodium Fluorescein and Brilliant Green.
Figure 7C:
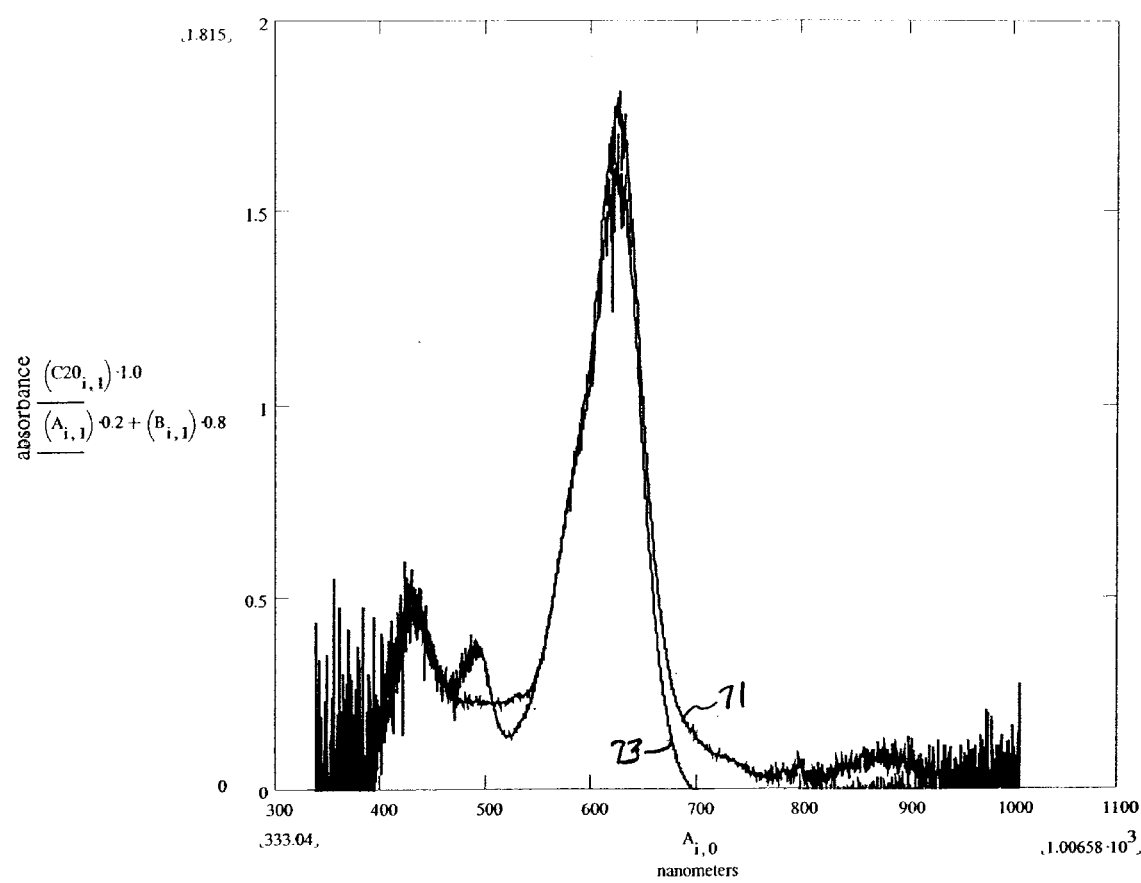
Figure 7D:
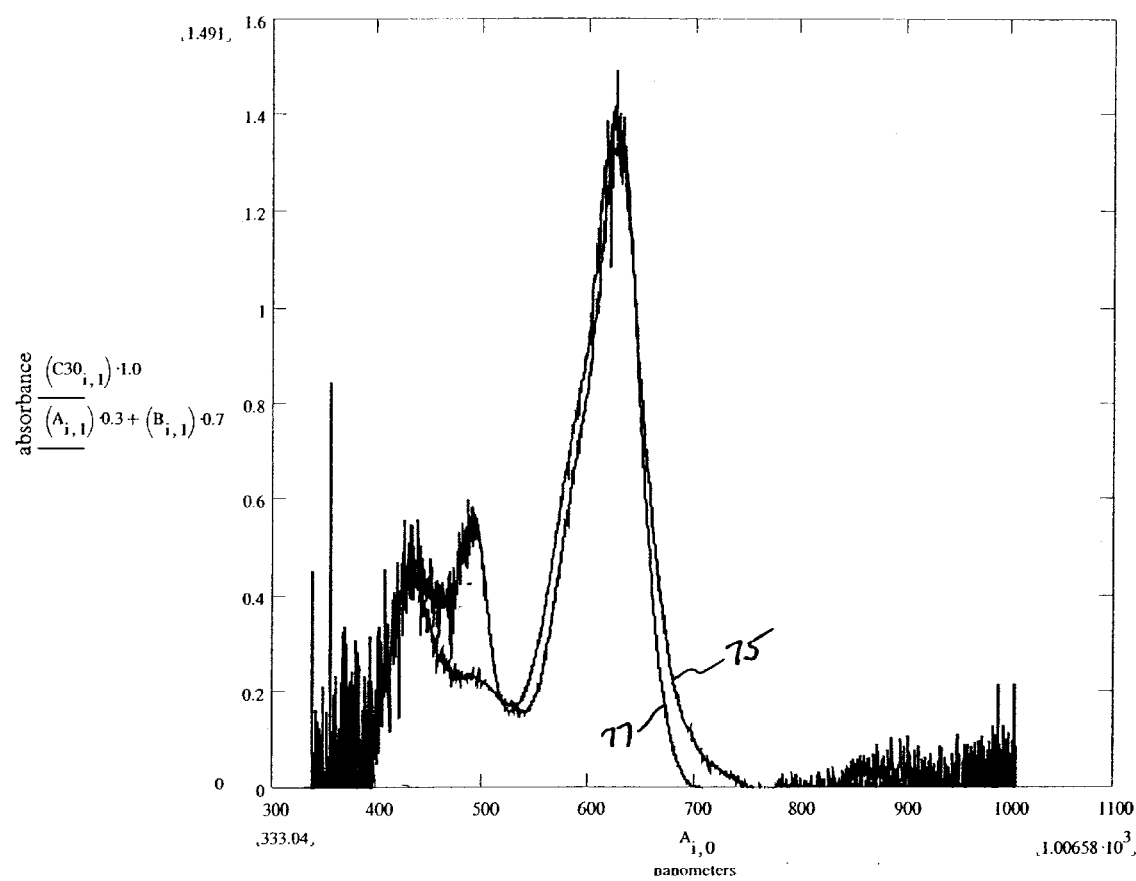
Figure 7E:
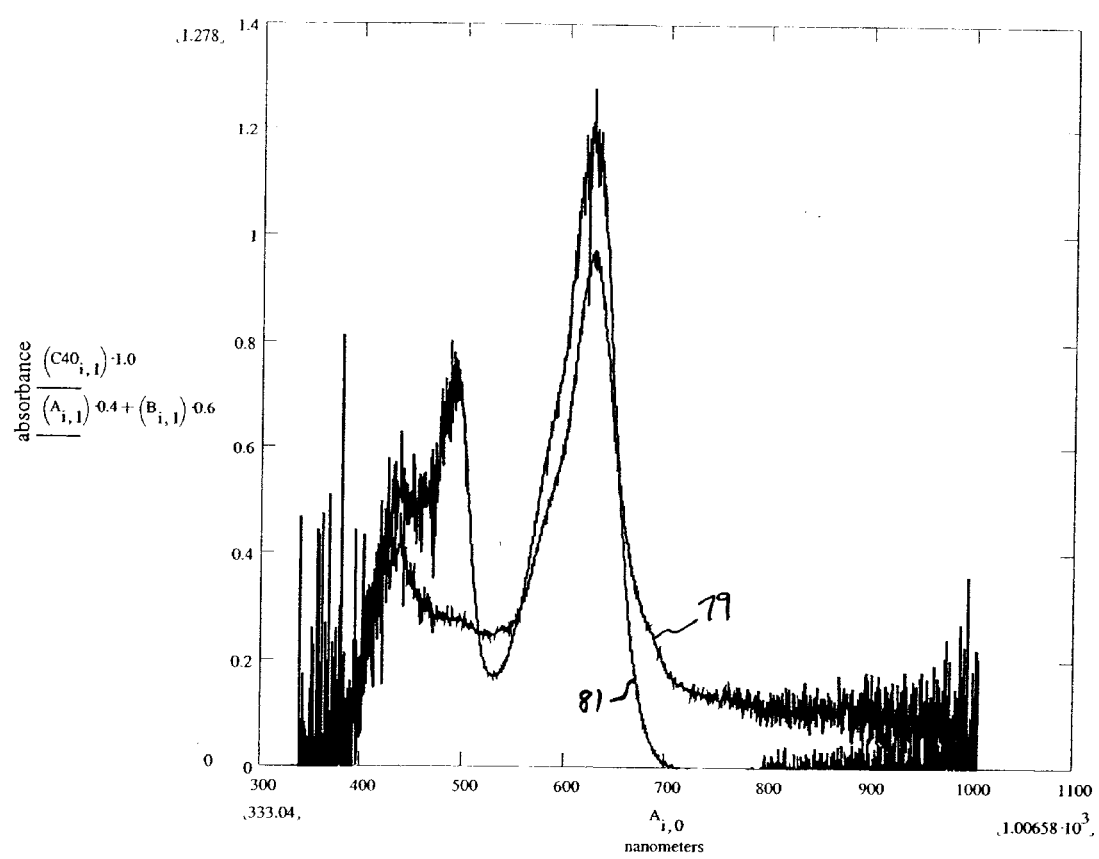
Figure 7F:
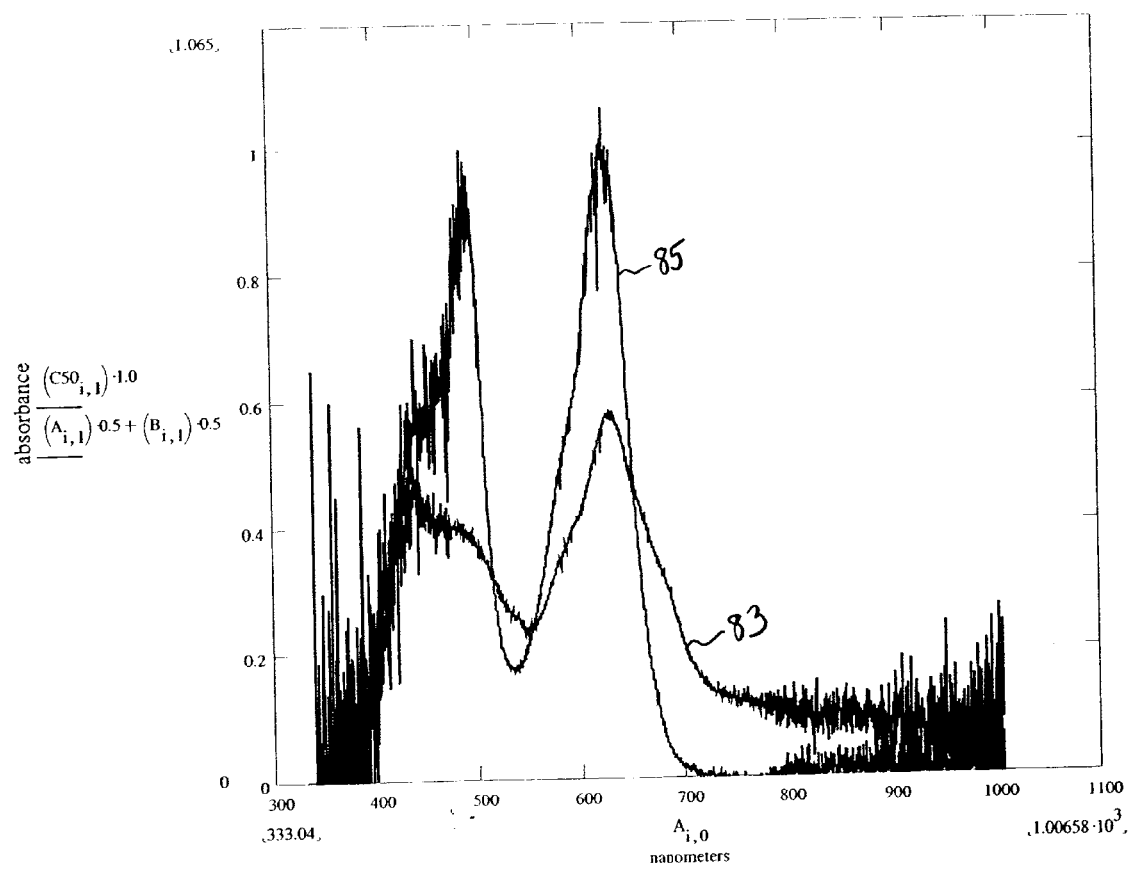
Figure 7G:
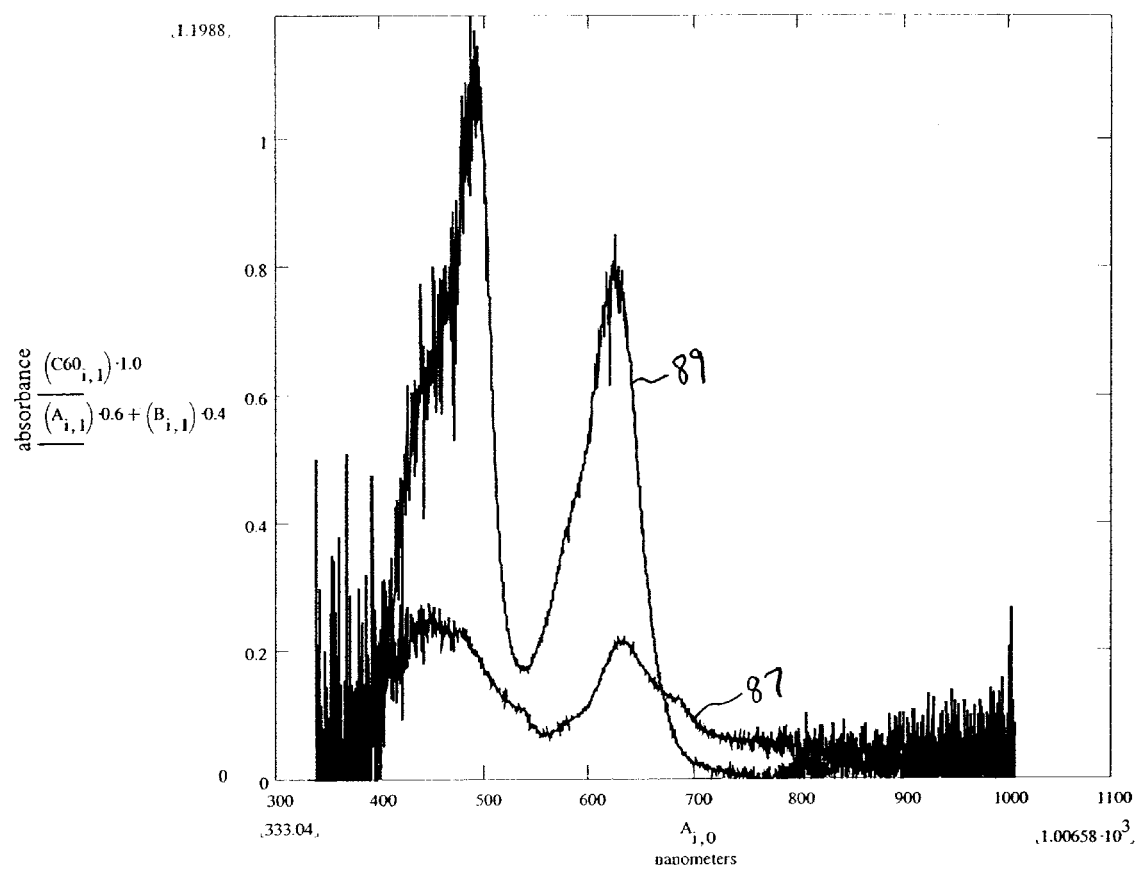
Figure 7H:
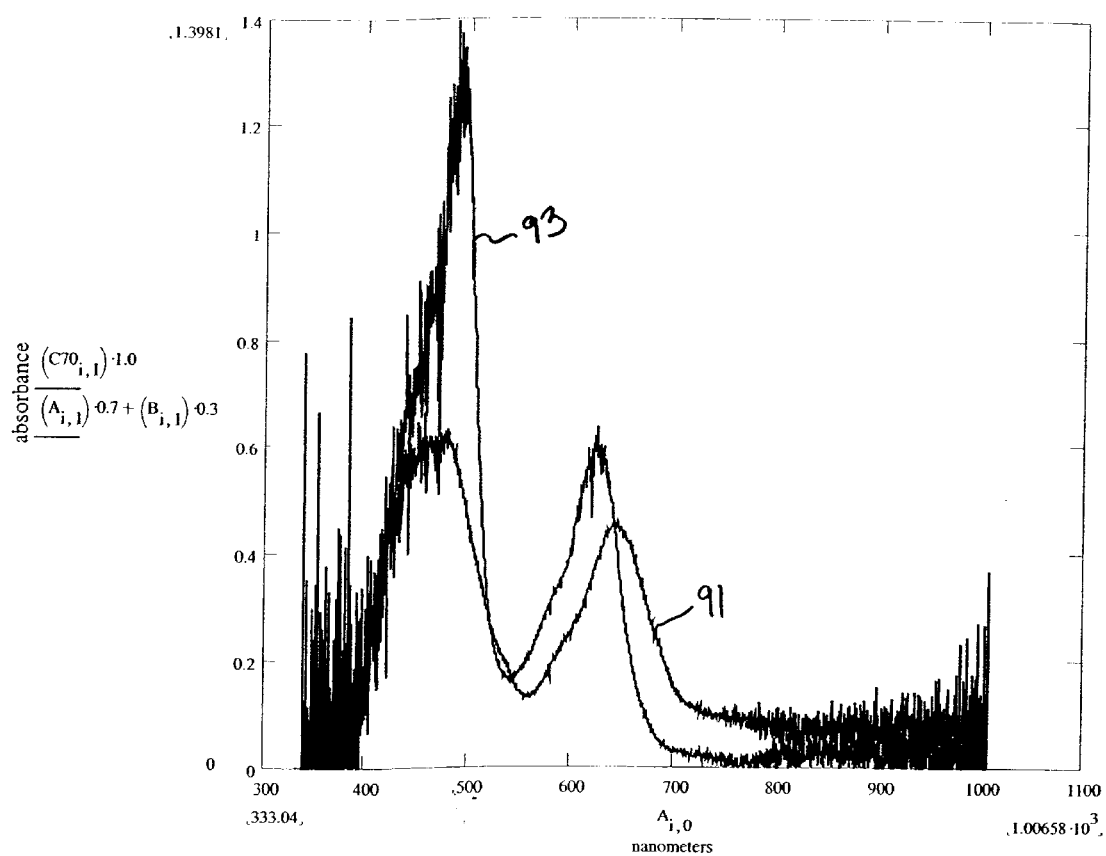
Figure 7I:
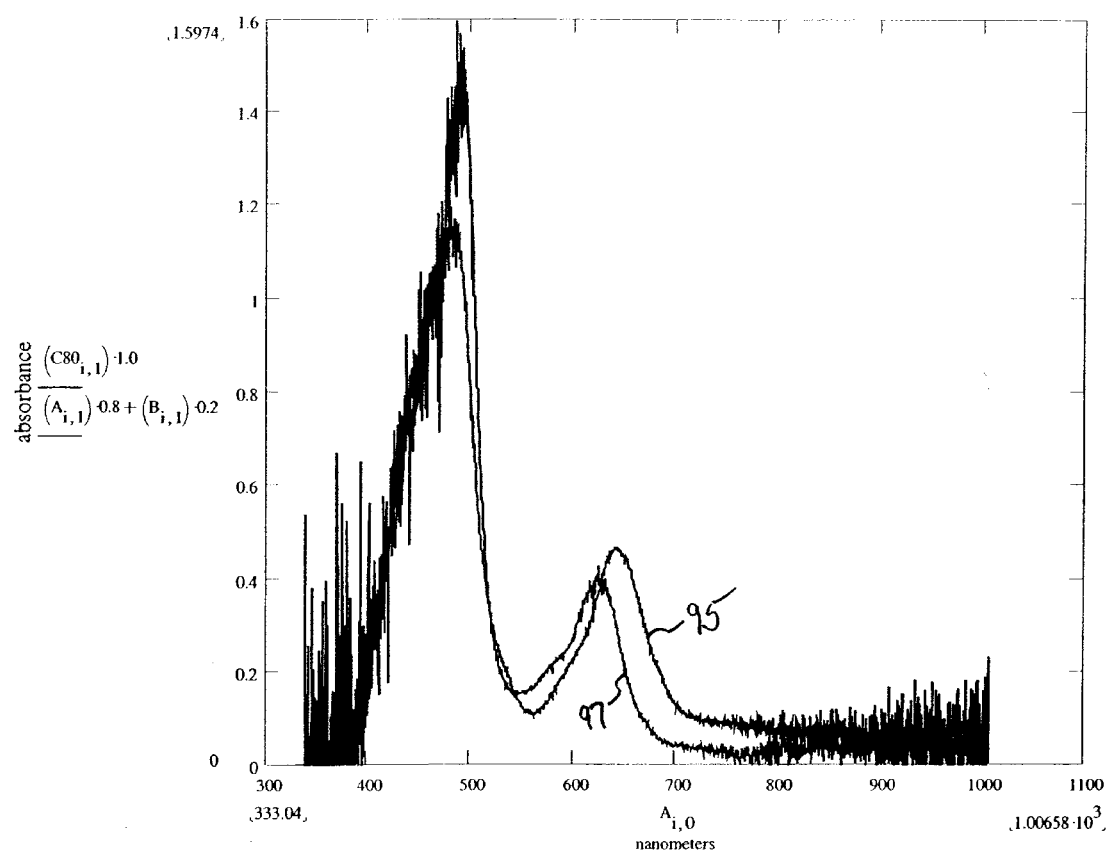
Figure 7J:
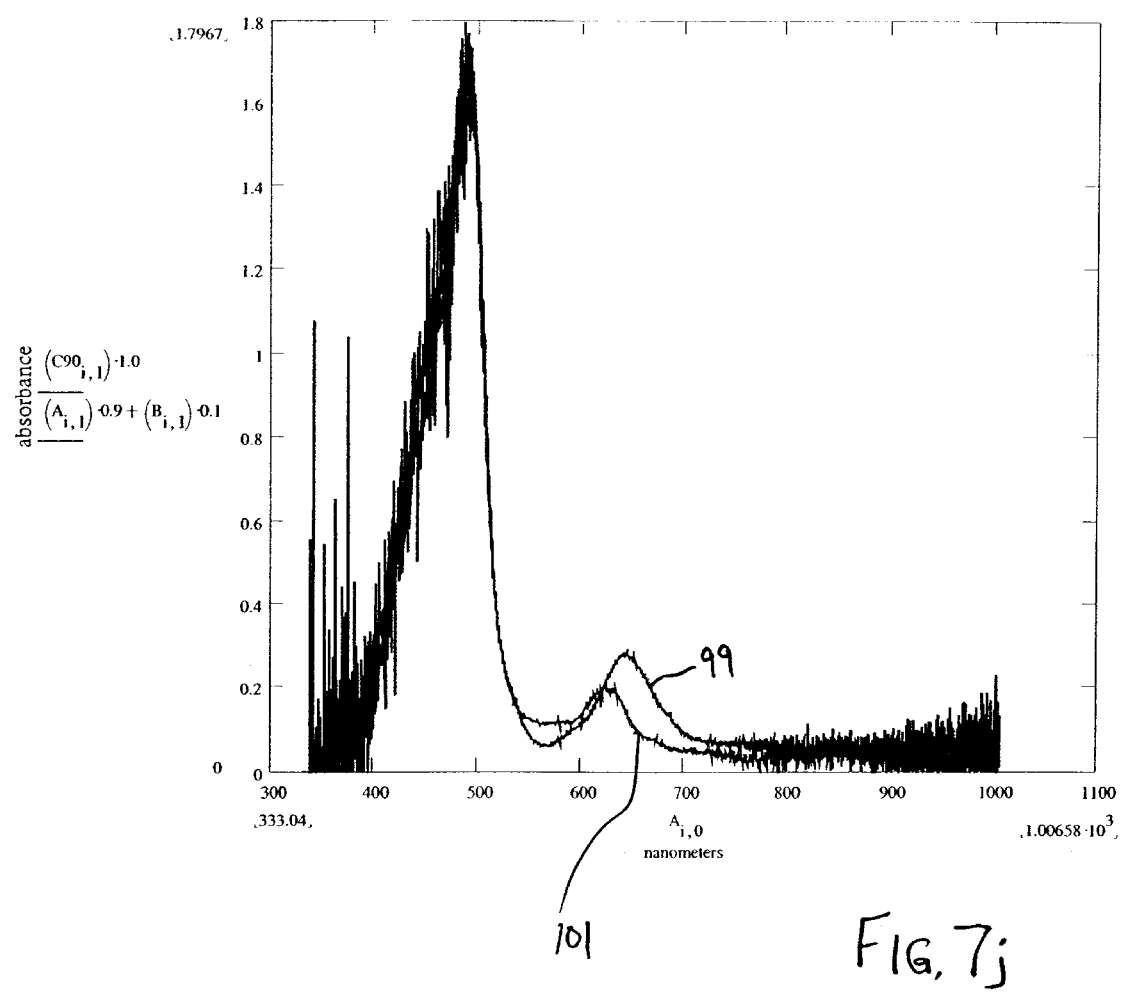

Attention is directed to FIGS. 7a–7j and 8a–8j, illustrating spectral responses of mixtures of dyes which deviate from a predicted spectral response when linearly additively combining the spectral responses of each component of the mixture. In FIG. 7a, curves 66 and 68 respectively represent absorbance patterns of Sodium Fluorescein and Brilliant Green individually. FIGS. 7b–7j each show a measured absorbance of the physically mixed dyes, and a predicted linearly additive absorbance of the two dyes combined. In FIGS. 7b–7j, the curves represented by reference characters 67, 71, 75, 79, 83, 87, 91, 95 and 99 represent the measured absorbance of the physically mixed dyes, while the curves represented by reference characters 69, 73, 77, 81, 85, 89, 93, 97 and 101 represent the predicted linearly additive absorbance. FIG. 7b has 10% Sodium Fluorescein and 90% Brilliant Green; and FIG. 7c has 20% Sodium Fluorescein and 80% Brilliant Green. Remaining FIGS. 7d–7j incrementally increase the amount of Sodium Fluorescein by 10%, and incrementally decrease the amount of Brilliant Green by 10%. As can be seen in FIGS. 7b–7j, the measured absorbance deviates from the predicted linearly additive absorbance, and these mixed dyes can be used according to the present invention.

Figure 8A:
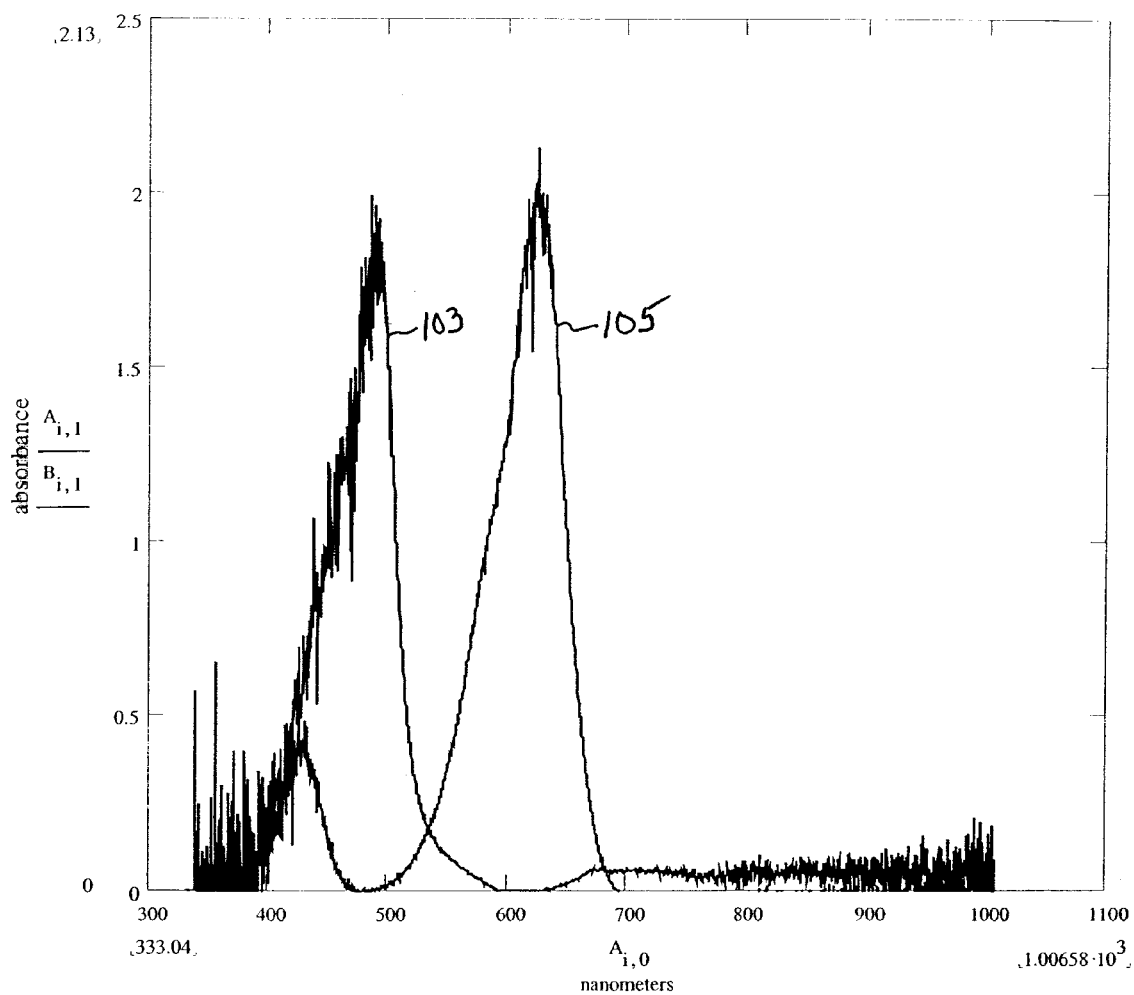
FIG. 8a is a graph showing respective absorbances, at different wavelengths, of Toluidine Blue O and Acrydine Orange individually.
Figure 8B:
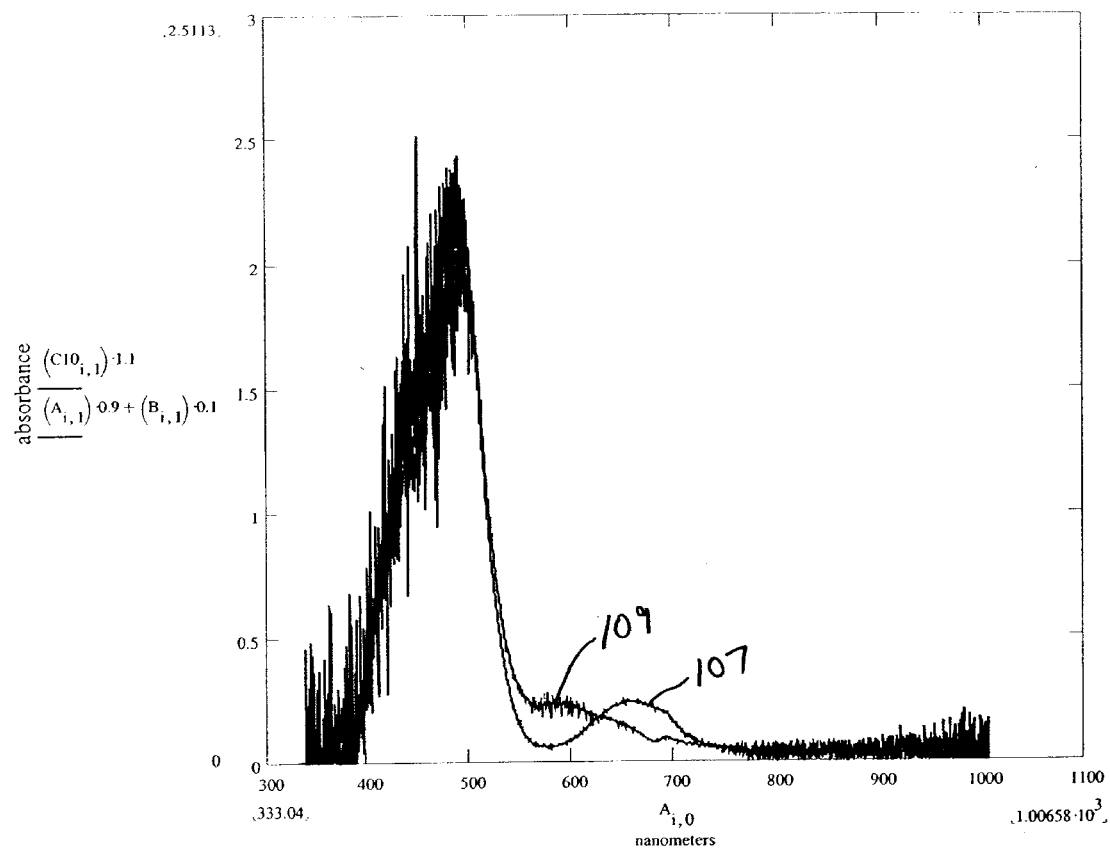
FIGS. 8b–8j are graphs showing absorbance, at different light wavelengths, of various mixtures of Toluidine Blue O and Acrydine Orange, as compared to a predicted (theoretical) linearly additively combining of absorbances of such mixtures of Toluidine Blue O and Acrydine Orange.
Figure 8C:
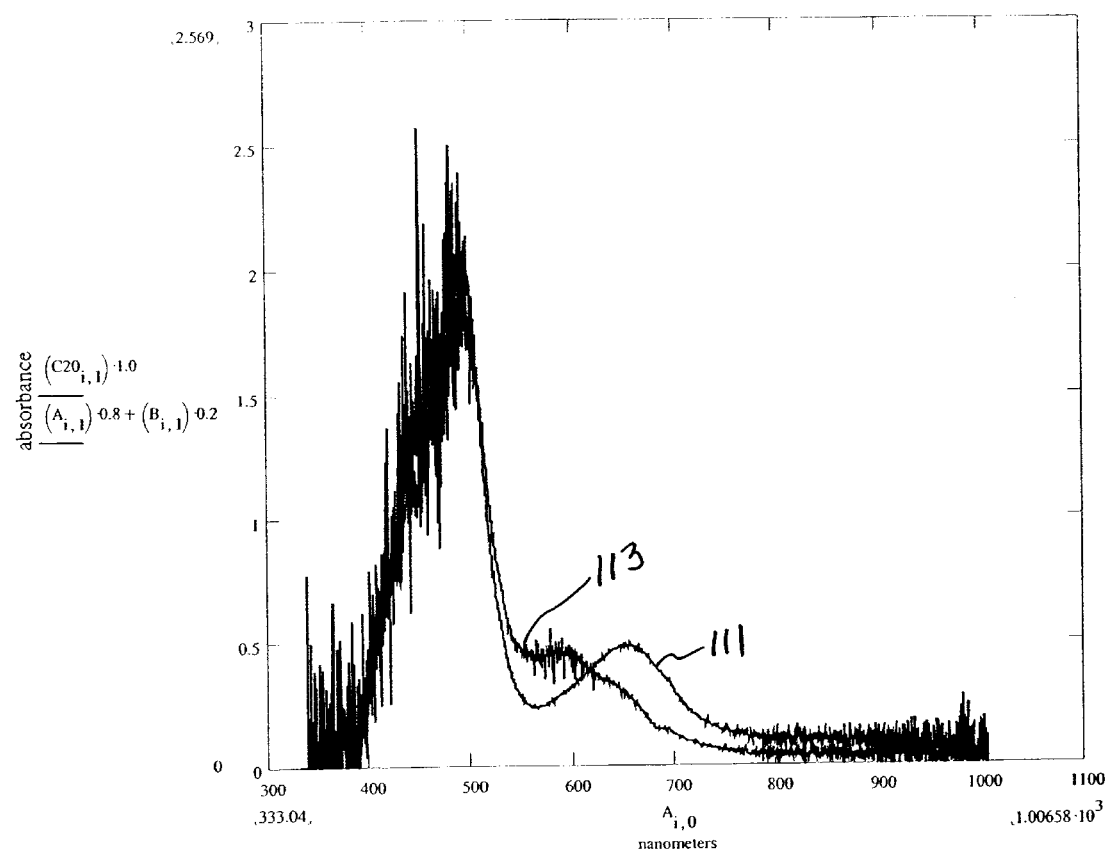
Figure 8D:
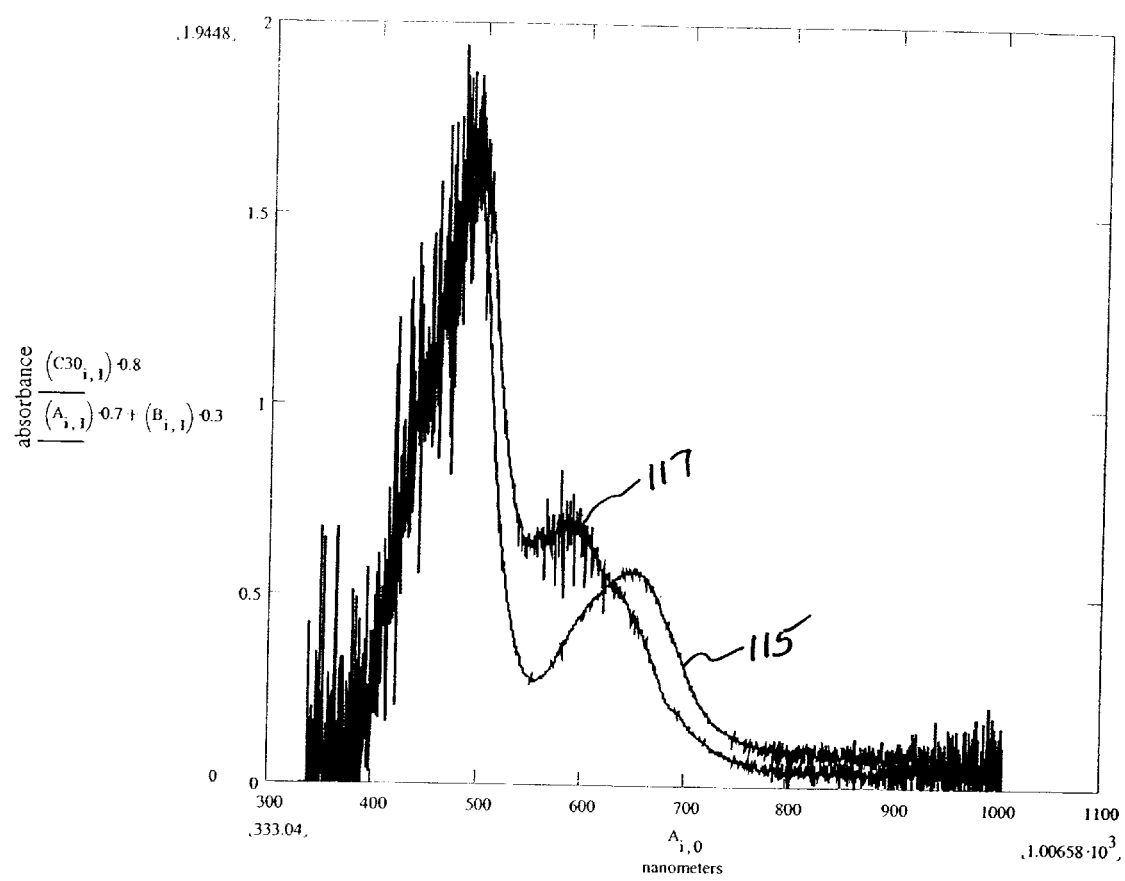
Figure 8E:
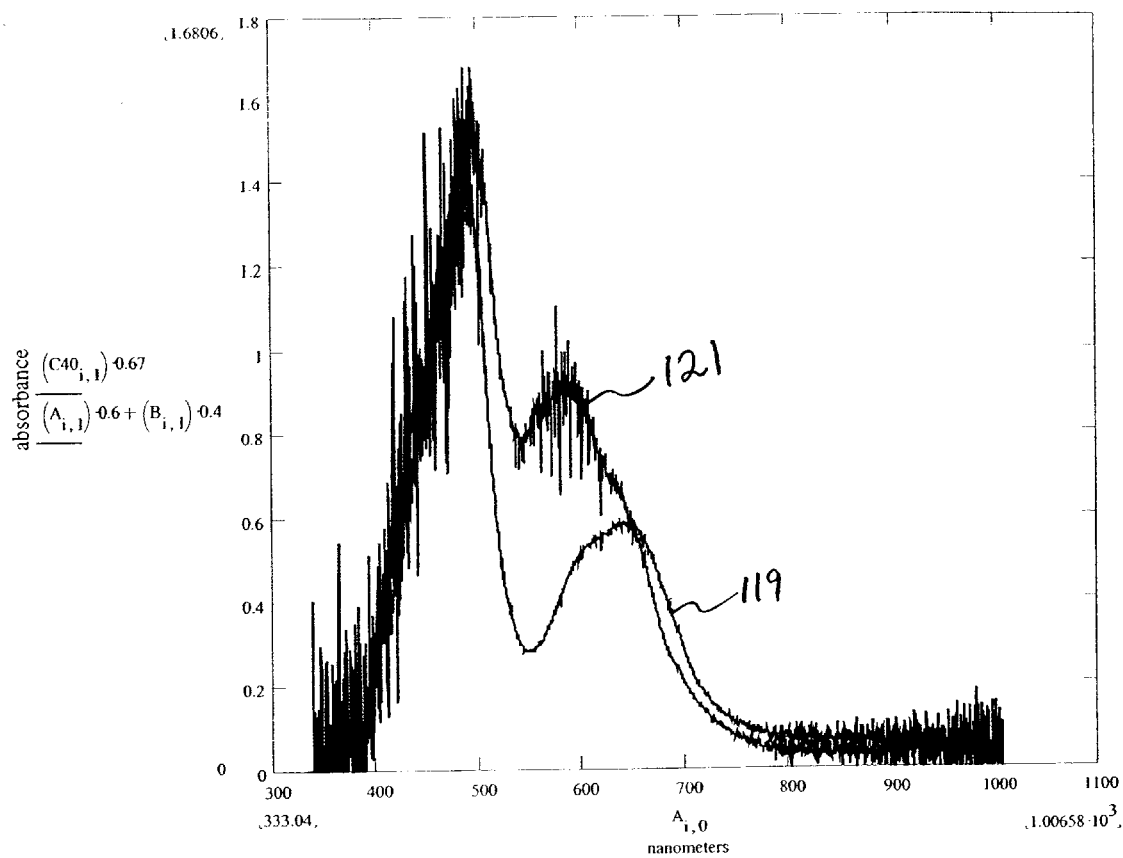
Figure 8F:
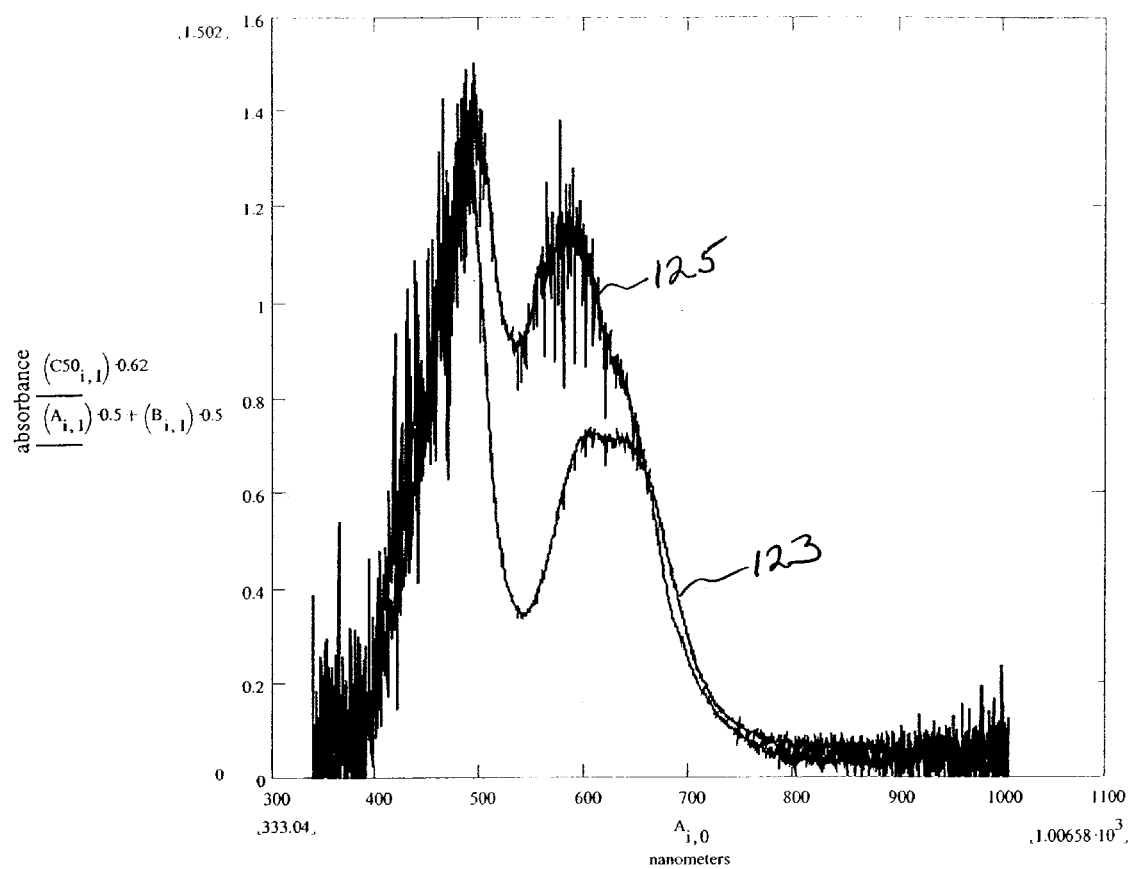
Figure 8G:
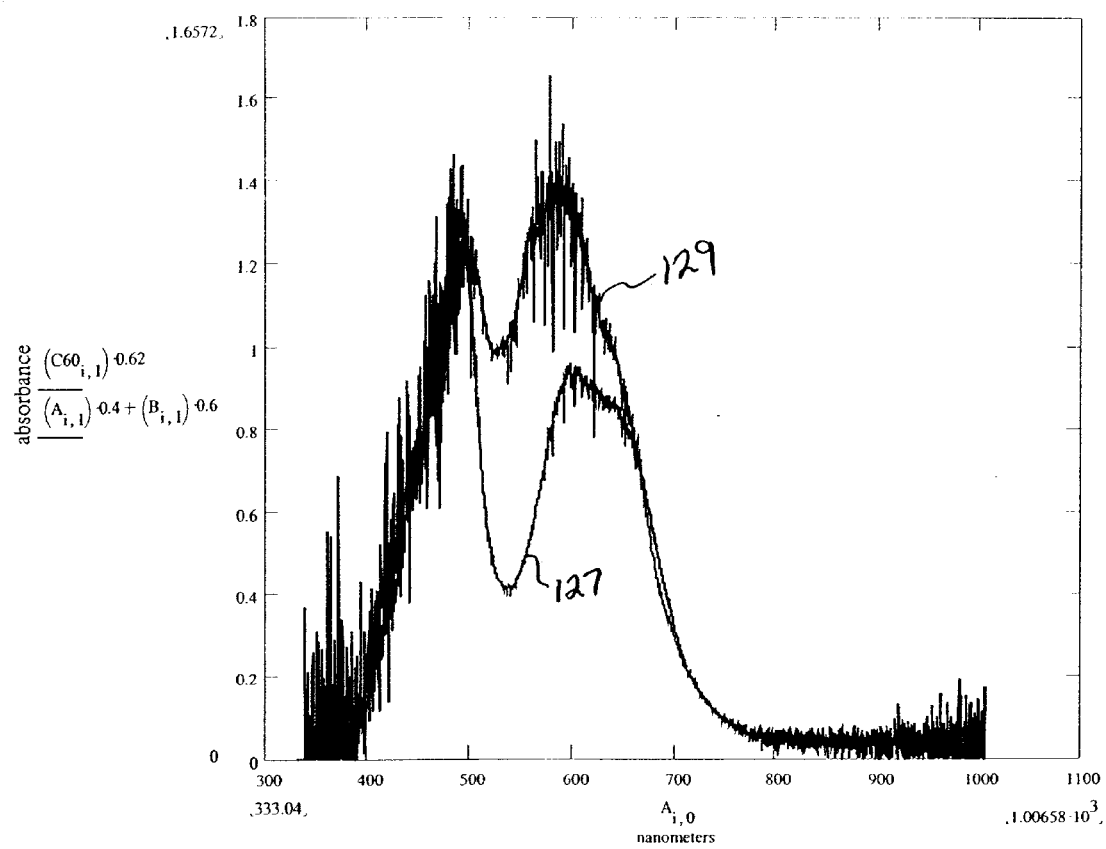
Figure 8H:
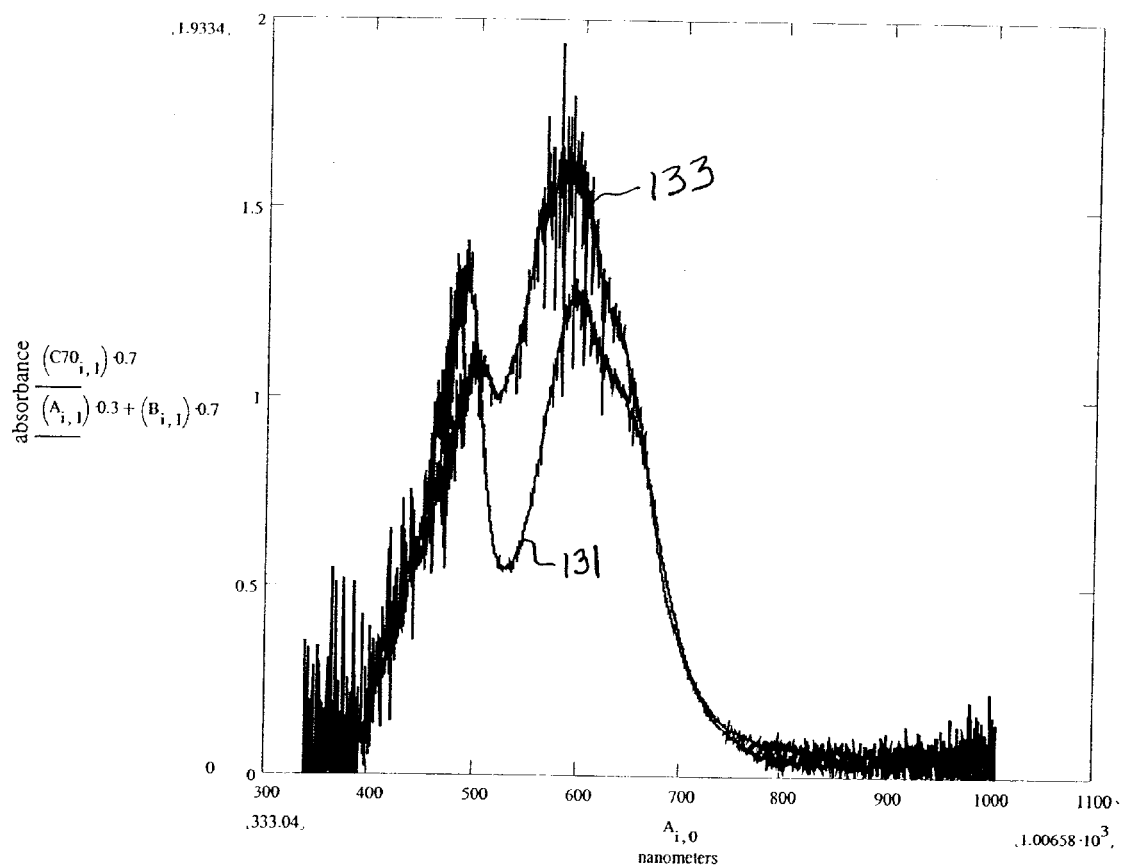
Figure 8I:
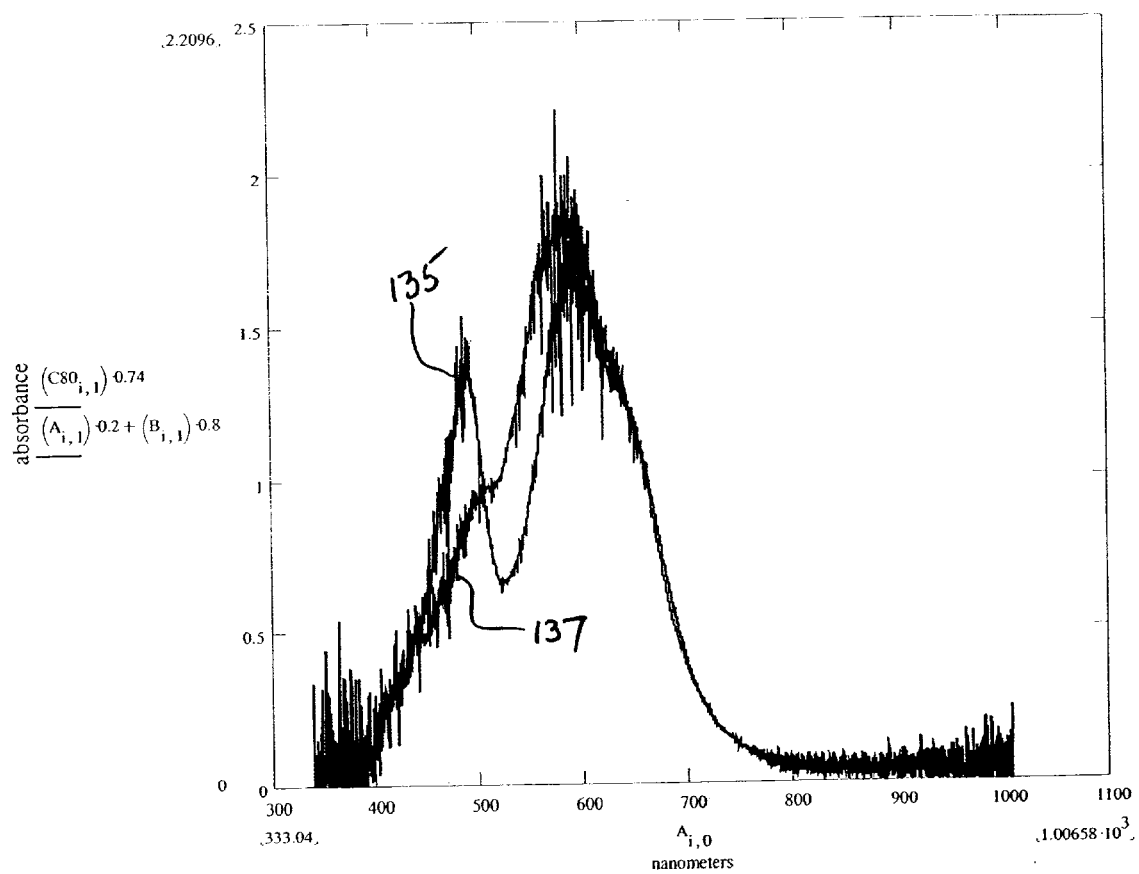
Figure 8J:
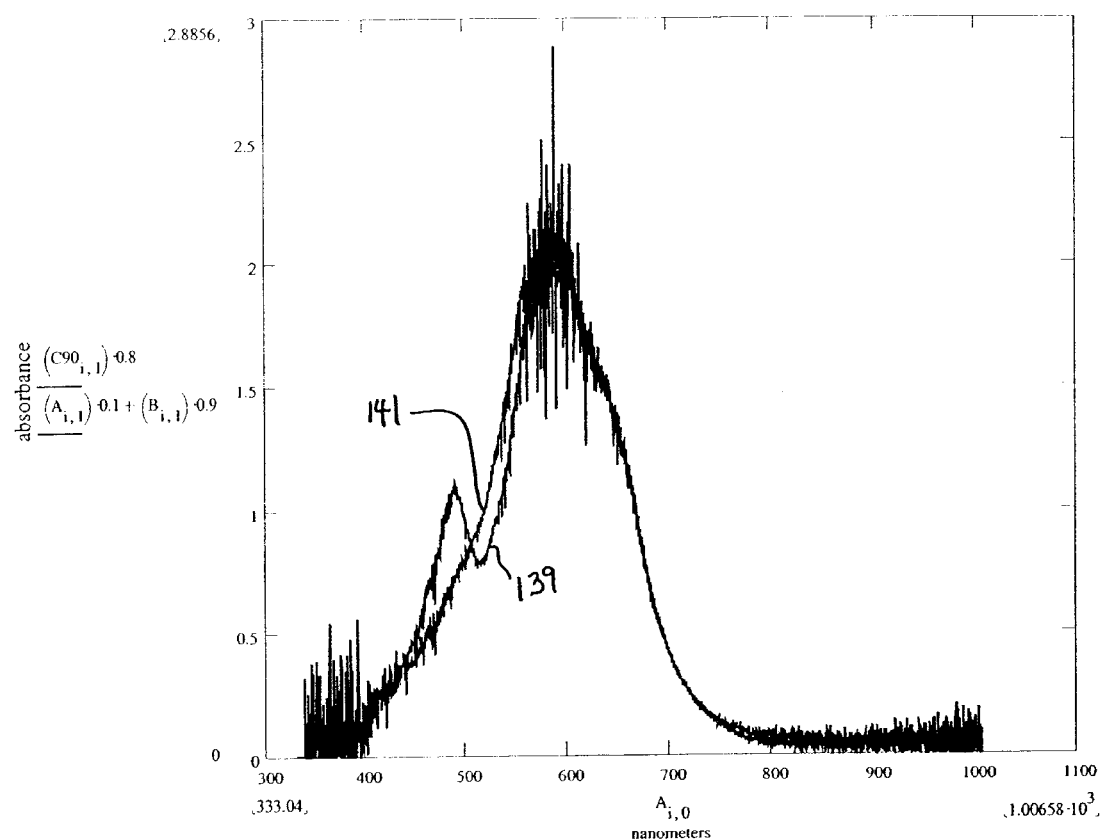

Similarly, FIG. 8a respectively shows the individual absorbance spectra of Acrydine orange and Toluidine Blue O, by the curves represented by reference characters 103 and 105. In FIGS. 8b–8j are shown measured absorbances and predicted linearly additive absorbances of mixtures of the Toluidine Blue O and Acrydine Orange. In FIGS. 8b–8j, curves represented by reference characters 107, 111, 115, 119, 123, 127, 131, 135 and 139 represent the measured absorbance of the physically mixed dyes, and reference characters 109, 113, 117, 121, 125, 129, 133, 137 and 141 represent the predicted linearly additive absorbance. FIG. 8b includes a mixture of 10% Toluidine Blue O and 90% Acrydine Orange; and FIG. 8c includes a mixture of 20% Toluidine Blue O and 80% Acrydine Orange. The remaining FIGS. 8d–8j respectively include amounts of Toluidine Blue O increasing incrementally by 10% and amounts of Acrydine Orange decreasing incrementally by 10%. As can be seen in FIGS. 8b–8j, the measured absorbance deviates from the predicted linearly additive absorbance, and these mixtures can be used according to the present invention.

In the following Table 1 is set forth nine combinations of dyes tested for nonlinear additive combining of the spectral response of the mixture. As can be seen in this table, various of the dye combinations are linearly additive, and various are not. The ones which are not provide especially desired results in connection with the present invention. In this regard, all of the dye mixtures, including those listed as linearly additive, showed some deviation from the predicted additively linear combining of the individual spectra. Those listed as linearly additive typically had some spectral regions that had 10% to 20% deviations from their predicted values, but otherwise matched the general shape and amplitude of the predicted spectra. Those dye combinations listed as being strongly nonadditive had spectral regions with absorbtivities that deviated by factors of two or more from their predicted linearly additive values.

TABLE 1

| Dye Combination | Result |
| --- | --- |
| Acrydine Orange - Toluidine Blue O | Nonadditive |
| Safranin O - Acrydine Orange | Linearly additive |
| Acrydine Orange - Azure B | Nonadditive |
| Azure B - Safranin O | Linearly additive |
| Sodium Flourescein - Brilliant Green | Strongly nonadditive |
| Rhodamine B - Brilliant Green | Slightly nonadditive |
| Sodium Flourescein - Rhodamine B | Nonadditive |
| Sodium Flourescein - Rhodamine B - Brilliant Green | Strongly Nonadditive |
| Acrydine Orange - Azure B - Safranin O | Nonadditive |

Accordingly, by the present invention, a document security and authentication technique is achieved which is simple and relatively resistant to counterfeiting, while being relatively inexpensive and which can use low-cost consumer grade hardware. The technique is resistant to being compromised by thefts of raw material or from attack by well-financed counterfeiters, and is economically very satisfactory. Moreover, the method can be readily scaled for use in both low-and-high-security applications.

Many different embodiments of the present invention may be constructed without departing from the spirit and scope of the invention. For example, the print pattern is not limited to microdot arrays or objects such as logos and alphanumeric characters made up from suitably arranged microdots, but includes, e.g., continuous area gradient mixing of cross-reacting dyes forming images, logos, backgrounds or abstract patterns. Narrow band filters can be used to view the images, allowing for greater discrimination of fine spectral variations but require greater levels of illumination which may limit ability to use low-cost imaging hardware. And while CCD or CMOS cameras are presently preferred image verification hardware, e.g., for economic reasons, they are not the only means for viewing the patterns; vidicon and other vacuum tube based imagers illustratively can also be used. Generally, any imaging method that can get a spectrally bandpassed image into a computer (including, e.g., human viewing and typing in the perceived relative intensities) can in principle be used. One of the preferred implementations for use by consumers involves interfacing the readers to wireless Internet-connected personal digital assistants (PDA's, i.e., handheld computers). It should be understood that the present invention is not limited to the specific embodiments described in this specification. To the contrary, the present invention is intended to cover various modifications and equivalent arrangements included within the spirit and scope of the claims.

We claim:

1. A printing method for producing a printed object that is resistant to counterfeiting, comprising a step of applying an ink composition to a substrate which is a substrate of an object that needs protection against counterfeiting, thereby forming the printed object, the ink composition comprising a mixture of at least two ink components having respective spectral responses, wherein the spectral response of the mixture of the at least two ink components deviates from a predicted spectral response when linearly additively combining the respective spectral responses.

2. The printing method according to claim 1, wherein the substrate is a paper substrate.

3. The printing method according to claim 1, wherein the ink composition is an inkjet composition, and said inkjet composition is applied to the substrate by an inkjet printer.

4. The printing method according to claim 3, wherein the ink composition is applied in the form of at least one microdot.

5. The printing method according to claim 4, wherein the at least one microdot is a plurality of microdots which form an identifying mark.

6. A printing method for producing a printed object that is resistant to counterfeiting, comprising the steps of:

providing a set of ink components comprising a plurality of different ink components having respective spectral responses, whereby at least two of the different ink components can be mixed together to provide an ink composition, the at least two of the different ink components, when mixed together, providing a spectral response of the mixture which deviates from a predicted spectral response when linearly additively combining the respective spectral responses of the at least two of the different ink components;

selecting said at least two of the different ink components of the set of ink components;

mixing the selected at least two of the different ink components, so as to provide the ink composition; and applying said ink composition to a substrate which is a substrate of an object that needs protection against counterfeiting, thereby forming the printed object.

7. The printing method according to claim 6, comprising the further steps of:

selecting at least two more of the plurality of different ink components from said set, at least one of said at least two more of the plurality of different ink components being different from the ink components of said at least two of the plurality of different ink components;

mixing the selected at least two more of the plurality of different ink components, so as to provide a second ink composition different from said ink composition; and applying said second ink composition to said substrate.

8. The printing method according to claim 7, including the further step of making a template which indicates spectral responses of the ink composition and second ink composition on the substrate, and location of the ink composition and second ink composition as applied to the substrate.

9. The printing method according to claim 8, wherein the ink composition and second ink composition are applied by an inkjet printer to the substrate.

10. The printing method according to claim 9, wherein the ink composition and second ink composition are applied as microdots.

11. The printing method according to claim 6, comprising the further steps of:

further selection of at least two of the plurality of different ink components from said set, said further selection being performed so as to form a second ink composition different from said ink composition;

mixing said at least two of the plurality of different ink components selected in said further selection, so as to form said second ink composition; and applying said second ink composition to said substrate.

12. The printing method according to claim 11, wherein in said further selection step different amounts of the same ink components selected in said selecting step are selected, so as to form said second ink composition different from said ink composition.

13. The printing method according to claim 11, comprising the further step of making a template indicating the ink composition and second ink composition on the substrate, and location of the ink composition and second ink composition on the substrate.

14. The printing method according to claim 13, wherein the template indicates the spectral response of the ink composition and second ink composition.

15. The printing method according to claim 13, wherein the ink composition and second ink composition are applied as marks on the substrate, and the marks on the substrate are compared to the template to verify authenticity of the substrate with the marks thereon.

16. The printing method according to claim 6, including the further steps of making a template which indicates the ink composition and location thereof as applied to the substrate.

17. The printing method according to claim 16, wherein the template indicates the spectral response of the ink composition.

18. The printing method according to claim 17, wherein the ink composition as applied to the substrate is compared to the template to verify authenticity of the substrate with the ink composition thereon.

19. A printing method for forming a printed object that is resistant to counterfeiting, comprising the steps of:

applying coloring material to a substrate which is a substrate of an object that needs protection against counterfeiting, the coloring material having a spectral response; and conducting a chemical reaction of the coloring material so as to form the coloring material into a reaction product by the chemical reaction, the reaction product having a spectral response that is changed from the spectral response of the coloring material, thereby forming the printed object of the coloring material and the reaction product.

20. The printing method according to claim 19, wherein the coloring material includes powder-based pigments, which are deposited on the substrate, and wherein solvent is deposited on selected regions of the powder-based pigments in conducting the chemical reaction.

21. The printing method according to claim 20, wherein the solvent is deposited as microdots.

22. The printing method according to claim 19, wherein the coloring material includes a plurality of different coloring materials, and the conducting the chemical reaction includes chemically reacting at least some of the plurality of different coloring materials so as to change the spectral response of reacted portions.

23. The printing method according to claim 22, wherein the different coloring materials are selected from the group consisting of dyes and pigments.

24. Product formed by the method of claim 19.

25. A method of verifying authenticity of an object, comprising the steps of:

a) providing an object with at least one marking, having a corresponding spectral response, at a first location of the object, the object being an object needing protection against counterfeiting;

b) providing a template representing a spectral response of at least one authentic marking, said at least one authentic marking each being a marking formed from ink components, the at least one authentic marking each having a spectral response which deviates from a predicted spectral response when linearly additively combining respective spectral responses of the ink components of the at least one authentic marking; and c) comparing the object and the template to determine whether spectral responses of the at least one marking on the object and the at least one authentic marking of the template match, whereby, if the markings substantially match, the object is verified to be authentic.

26. The method of verifying authenticity according to claim 25, wherein the at least one authentic marking is a plurality of authentic markings each formed from an ink composition of a mixture of at least two different ink components, wherein the at least two different ink components, when mixed together, provide a spectral response of the mixture which deviates from a predicted spectral response when linearly additively combining respective spectral responses of the at least two different ink components.

27. The method of verifying authenticity according to claim 25, wherein the at least one authentic marking forms a pattern.

28. The method of verifying authenticity according to claim 25, wherein the at least one authentic marking is at least one microdot.

29. The method of verifying authenticity according to claim 25, wherein the step of providing the template includes placing an authentic object in a device to measure spectral responses of at least one marking on the authentic object, measuring the spectral responses of the at least one marking on the authentic object, to provide a measurement, and storing the measurement.

30. The method of verifying authenticity according to claim 29, wherein the measurement is stored in a computer, wherein the comparing includes a verification step, and wherein the verification step is carried out by the computer.

31. The method of verifying authenticity according to claim 30, wherein said comparing also includes a checking step, which, for different objects, is respectively performed at a plurality of locations, and said computer is at a location different from at least one of the locations at which said checking step is performed.

32. The printing method according to claim 1, wherein the spectral response of said mixture deviates at least 20% from the predicted spectral response when linearly additively combining the respective responses.

33. The printing method according to claim 6, wherein the spectral response of said mixture deviates at least 20% from the predicted spectral response when linearly additively combining the respective responses.

34. The printing method according to claim 6, wherein the mixing is performed at the time of applying said ink composition to the substrate.

* * * * *

UNITED STATES PATENT AND TRADEMARK OFFICE
CERTIFICATE OF CORRECTION

| | | |
|---|---|---|
| PATENT NO. | : 6,786,954 B1 | Page 1 of 1 |
| APPLICATION NO. | : 09/567006 | |
| DATED | : September 7, 2004 | |
| INVENTOR(S) | : Lee et al. | |

It is certified that error appears in the above-identified patent and that said Letters Patent is hereby corrected as shown below:

In the Specification, Col. 1, line 5, please insert:

-- FEDERALLY-SPONSORED RESEARCH OR DEVELOPMENT

This invention was made with Government support under contract DE-AC03-76SF00515 awarded by the Department of Energy. The Government has certain rights in this invention. --

Signed and Sealed this
Twenty-third Day of August, 2011

David J. Kappos
*Director of the United States Patent and Trademark Office*